(12) United States Patent
Chauville et al.

(10) Patent No.: US 7,532,766 B2
(45) Date of Patent: May 12, 2009

(54) METHOD AND SYSTEM FOR PRODUCING FORMATTED DATA RELATED TO GEOMETRIC DISTORTIONS

(75) Inventors: Benoit Chauville, Paris (FR); Frederic Guichard, Paris (FR); Jean-Marc Lavest, Clermont-Ferrand (FR); Bruno Liege, Paris (FR)

(73) Assignee: DO Labs, Boulogne (FR)

( * ) Notice: Subject to any disclaimer, the term of this patent is extended or adjusted under 35 U.S.C. 154(b) by 335 days.

(21) Appl. No.: 10/482,419

(22) PCT Filed: Jun. 5, 2002

(86) PCT No.: PCT/FR02/01906

§ 371 (c)(1),
(2), (4) Date: Jun. 8, 2004

(87) PCT Pub. No.: WO03/007237

PCT Pub. Date: Jan. 23, 2003

(65) Prior Publication Data

US 2004/0240750 A1 Dec. 2, 2004

(30) Foreign Application Priority Data

| Jul. 12, 2001 | (FR) | ................................... | 01 09291 |
| Jul. 12, 2001 | (FR) | ................................... | 01 09292 |
| Oct. 2, 2001 | (FR) | ................................... | 01 12664 |

(51) Int. Cl.
*G06K 9/40* (2006.01)

(52) U.S. Cl. .................. 382/254; 382/275; 382/276; 382/288

(58) Field of Classification Search .................. 382/275, 382/274, 269
See application file for complete search history.

(56) References Cited

U.S. PATENT DOCUMENTS 5,353,392 A 10/1994 Liquet et al.

(Continued)

FOREIGN PATENT DOCUMENTS

EP 0 867 690 9/1998

(Continued)

OTHER PUBLICATIONS

Reg G. Willson, Modeling and calibration of automated zoom lenses, Oct. 1994, Proceedings of SPIE, vol. 2350, p. 170-186.*

(Continued)

*Primary Examiner*—Matthew C Bella
*Assistant Examiner*—Eric Rush
(74) *Attorney, Agent, or Firm*—Oblon, Spivak, McClelland, Maier & Neustadt, P.C.

(57) ABSTRACT

A processing system and method for producing formatted information related to appliances of an appliance chain. This appliance chain includes at least one image-capture appliance and/or at least one image-restitution appliance for capturing and/or restituting an image on a medium. The system and method produce formatted information related to geometric distortions of at least one appliance of the chain. Fixed characteristics of the appliances and/or variable characteristics depending on the image can be taken into account. The fixed characteristics and/or the variable characteristics can be associated with one or more characteristic values, especially the focal length and/or the focusing. Then, measured formatted information related to the geometric distortions of the appliance are produced from a measured field. The system and method are applicable to photographic or video image processing, in optical devices, industrial controls, robotics, metrology, etc.

18 Claims, 20 Drawing Sheets

U.S. PATENT DOCUMENTS

| | | |
|---|---|---|
| 5,905,530 A | 5/1999 | Yokota et al. |
| 6,173,087 B1 | 1/2001 | Kumar et al. |
| 6,603,885 B1 * | 8/2003 | Enomoto ............... 382/263 |
| 6,791,616 B2 * | 9/2004 | Tamaki et al. ............ 348/335 |
| 6,816,625 B2 * | 11/2004 | Lewis et al. ............. 382/275 |
| 6,937,282 B1 * | 8/2005 | Some et al. ............. 348/335 |
| 2001/0014180 A1 * | 8/2001 | Ejiri et al. ............... 382/275 |
| 2003/0118227 A1 * | 6/2003 | Winsor et al. ............ 382/132 |
| 2004/0240750 A1 | 12/2004 | Chauville et al. |

FOREIGN PATENT DOCUMENTS

| | | |
|---|---|---|
| EP | 0 964 353 | 12/1999 |
| EP | 1 104 175 | 5/2001 |
| JP | 6-165024 | 6/1994 |
| JP | 6-205273 | 7/1994 |
| JP | 2000-125175 | 4/2000 |
| JP | 2000 137806 | 5/2000 |
| JP | 2002158915 A * | 5/2002 |
| WO | 99 27470 | 6/1999 |
| WO | 01 35052 | 5/2001 |

OTHER PUBLICATIONS

Reg G. Willson, "Modeling and calibration of automated zoom lenses", Oct. 1994, Proceedings of SPIE, vol. 2350, pp. 170-186.*
U.S. Appl. No. 10/482,413, filed Jan. 12, 2004, Liege et al.
U.S. Appl. No. 10/483,253, filed Jan. 12, 2004, Chauville et al.
U.S. Appl. No. 10/482,419, filed Jan. 12, 2004, Chauville et al.
U.S. Appl. No. 10/483,252, filed Jan. 12, 2004, Chauville et al.
U.S. Appl. No. 10/483,322, filed Jan. 12, 2004, Liege et al.
U.S. Appl. No. 10/483,495, filed Jan. 12, 2004, Chanas et al.
U.S. Appl. No. 10/483,496, filed Jan. 12, 2004, Chanas et al.
U.S. Appl. No. 10/483,494, filed Jan. 12, 2004, Liege et al.
U.S. Appl. No. 10/483,497, filed Jan. 12, 2004, Liege et al.
Watanabe M et al., "An Image Data File Format for Digital Still Camera", Final Program and Advance Printing of Papers. Annual Conference. Imaging on the Information Superhighway, pp. 421-424 1995.
U.S. Appl. No. 12/097,886, filed Jun. 18, 2008, Liege.
U.S. Appl. No. 12/158,129, filed Aug. 22, 2008, Liege.
U.S. Appl. No. 12/097,893, filed Jun. 18, 2008, Liege.

* cited by examiner

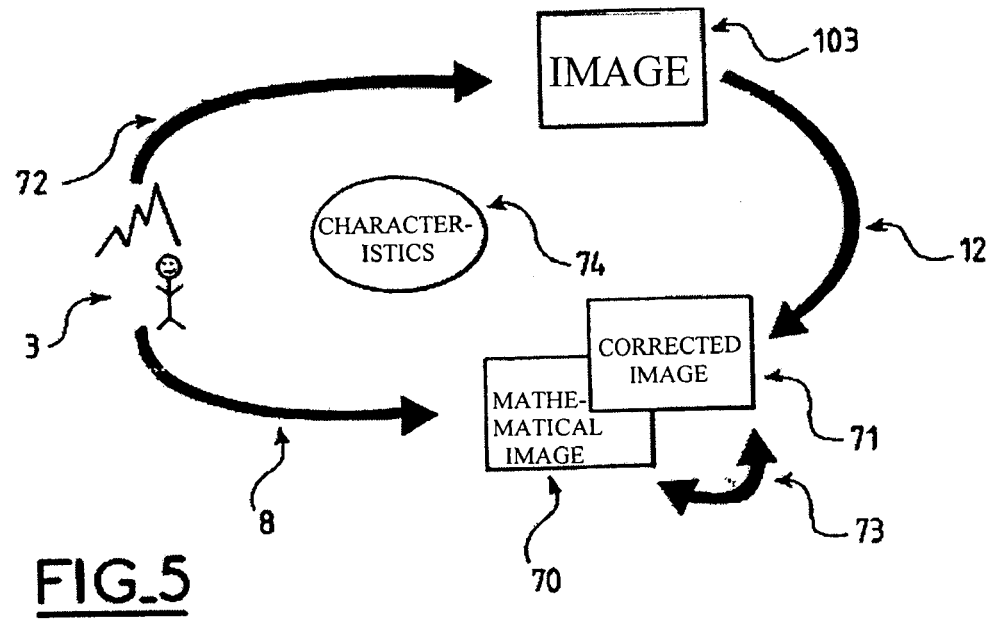
FIG_5
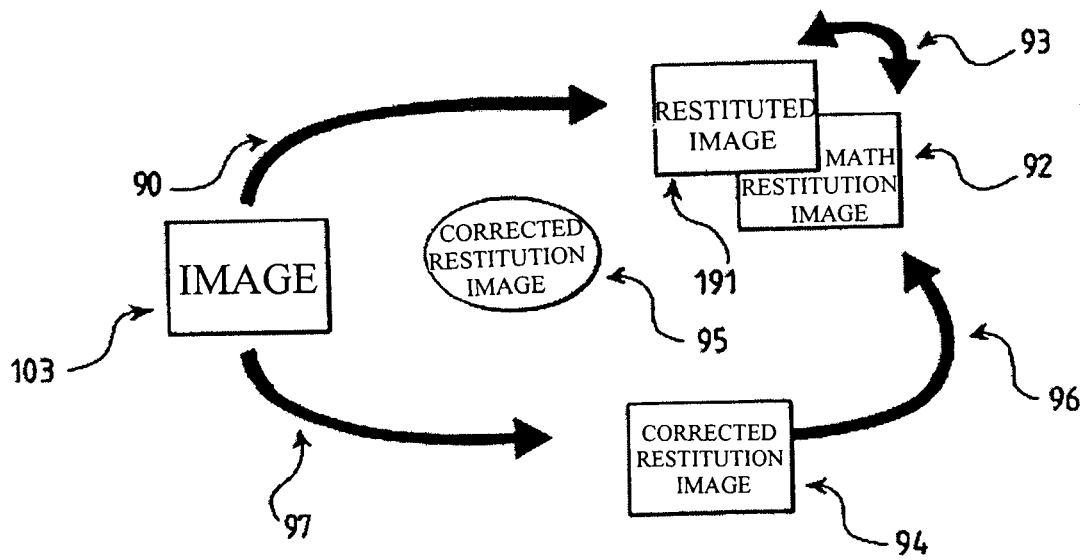
FIG_6

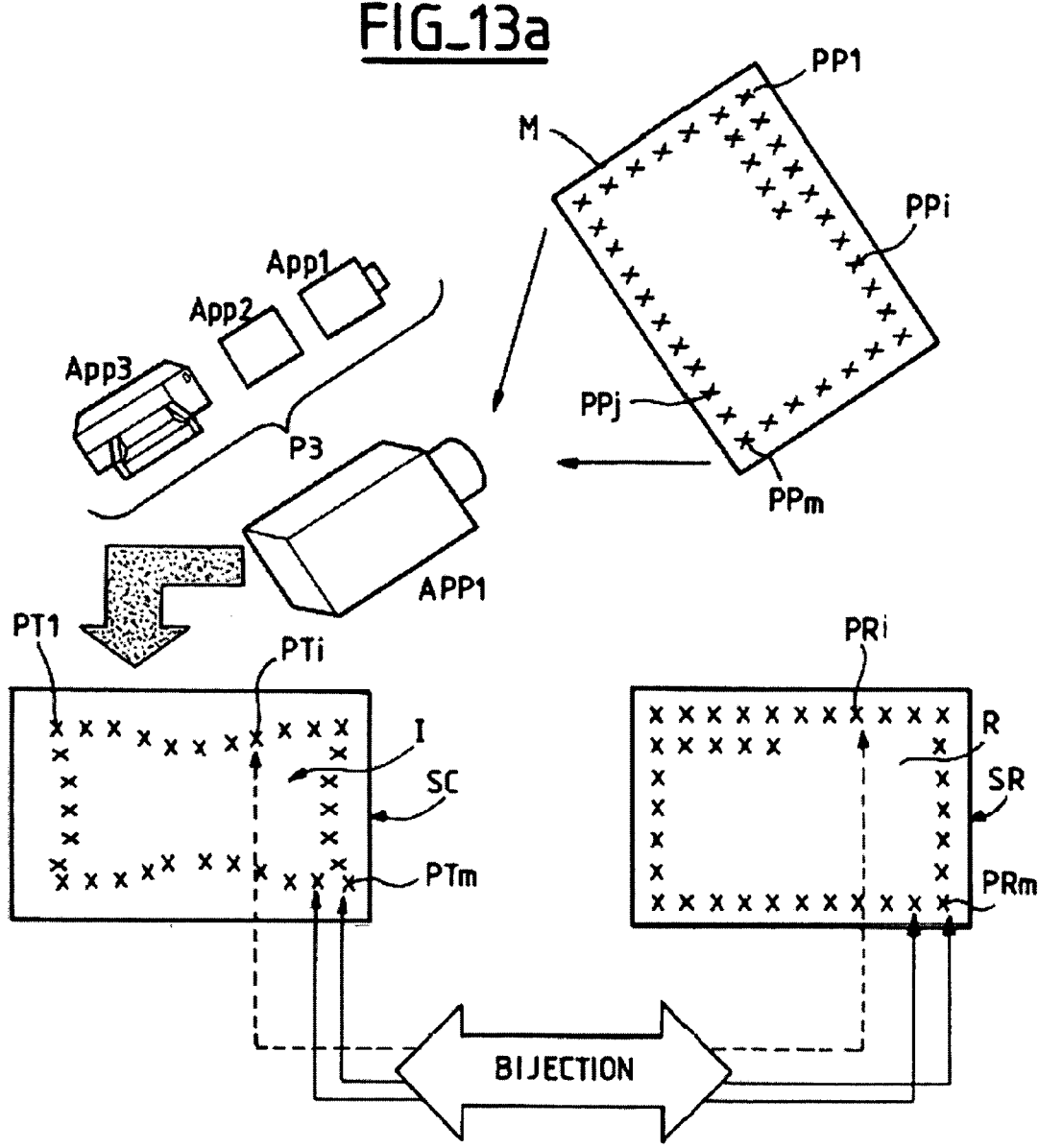

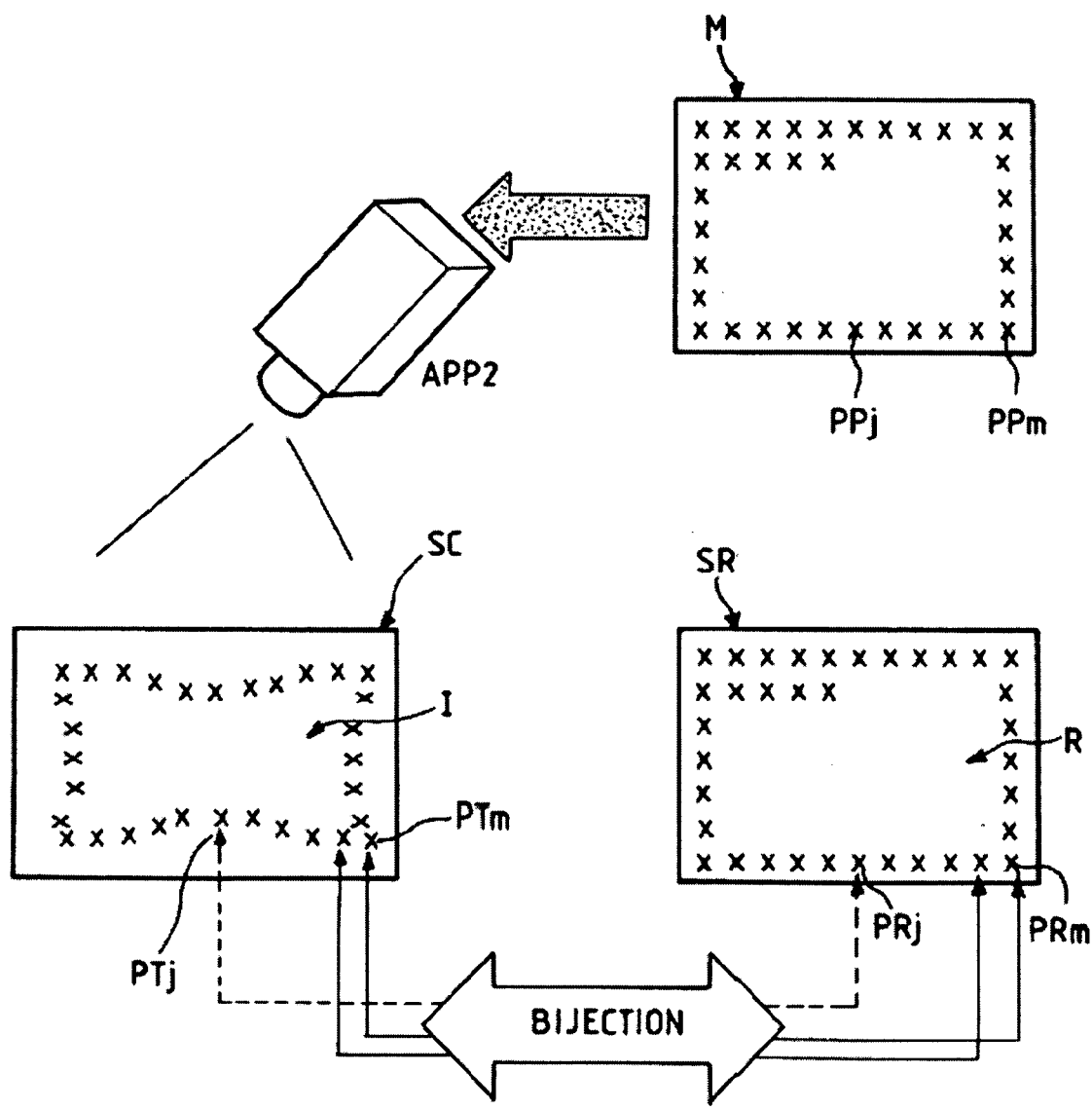
FIG_13b

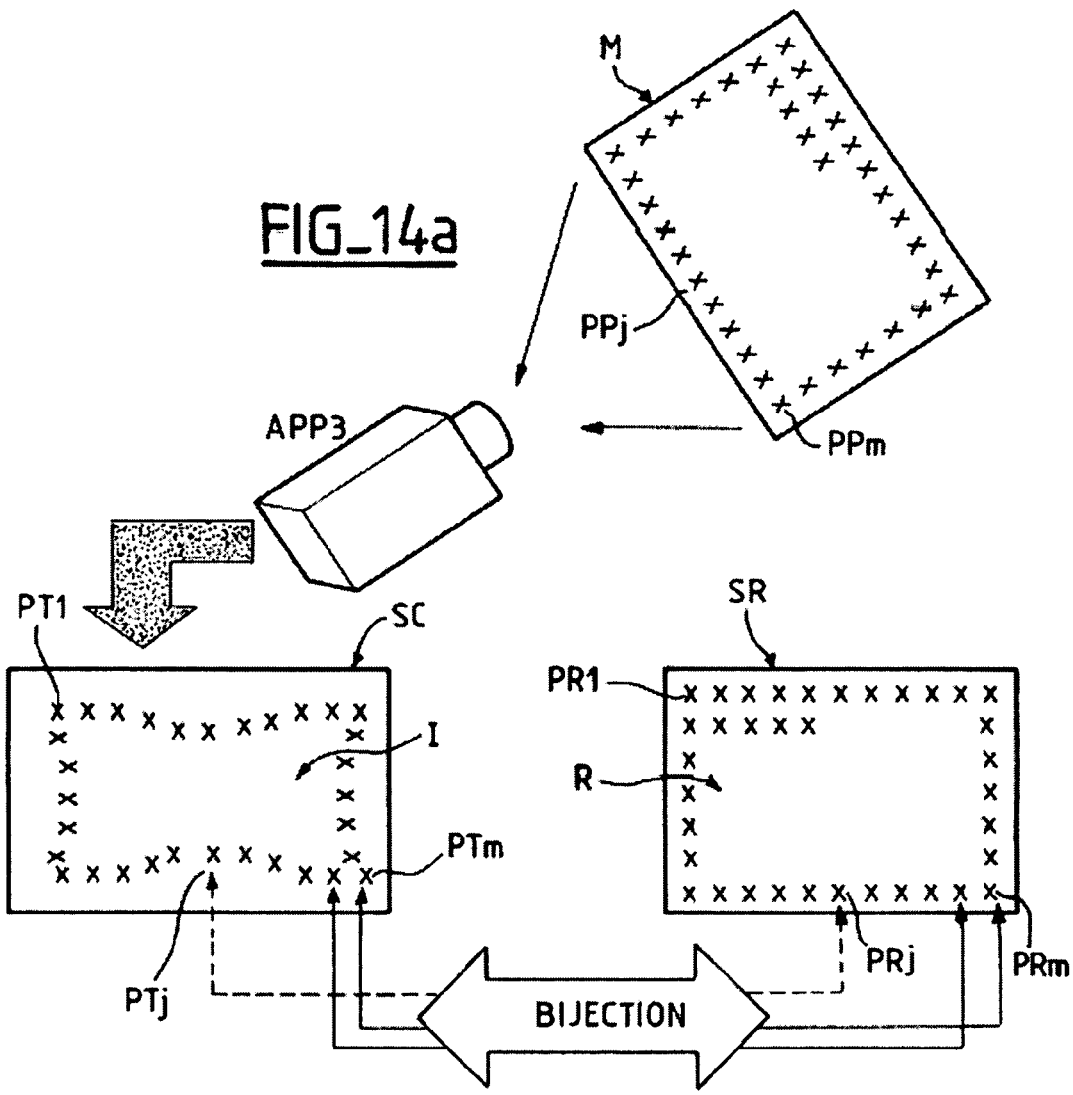
FIG_14a
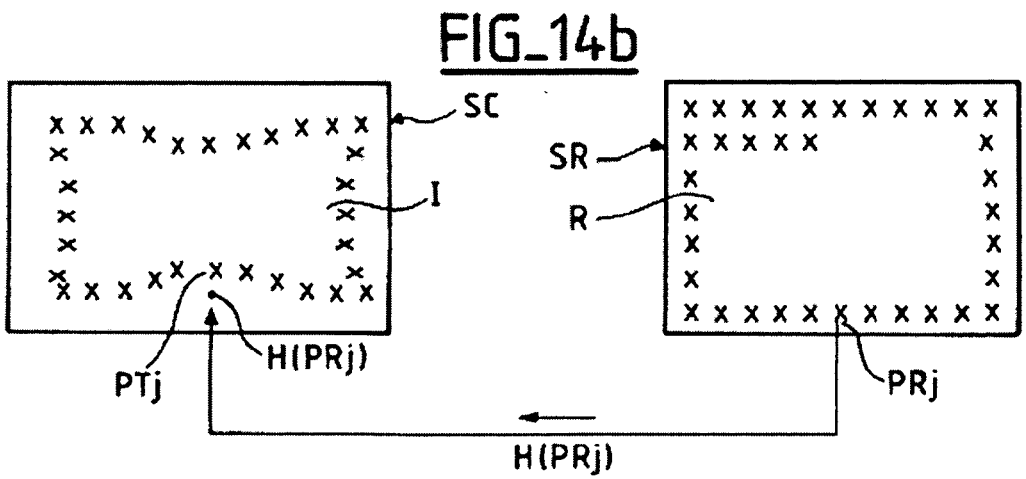
FIG_14b

FIG_15a
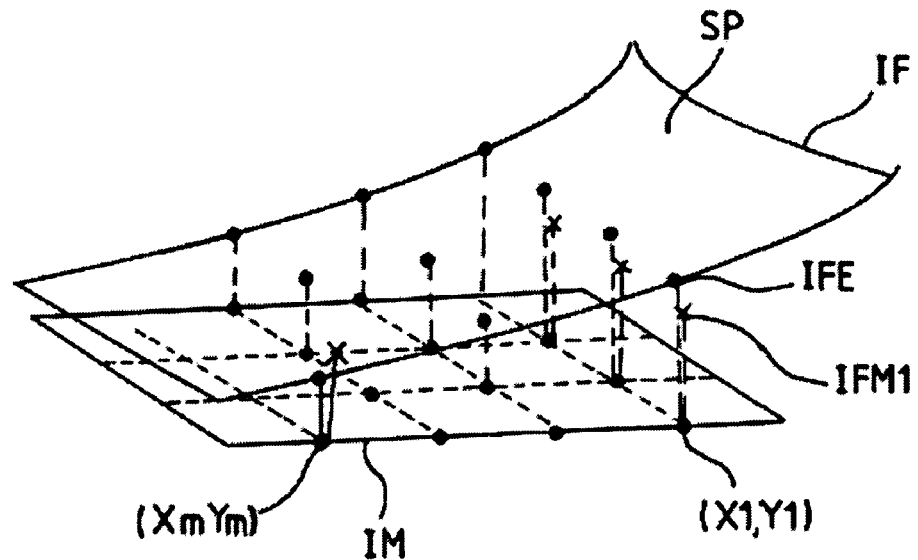
FIG_15b
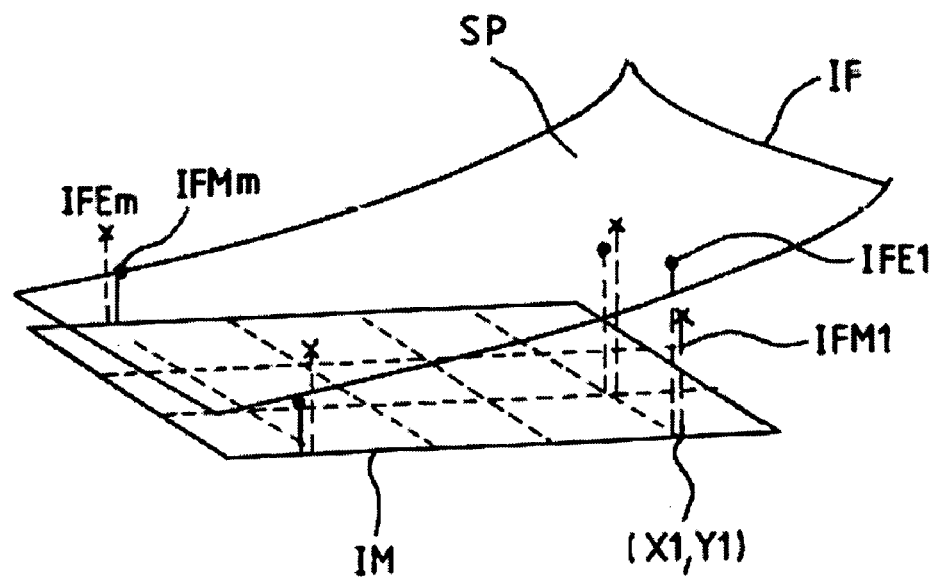

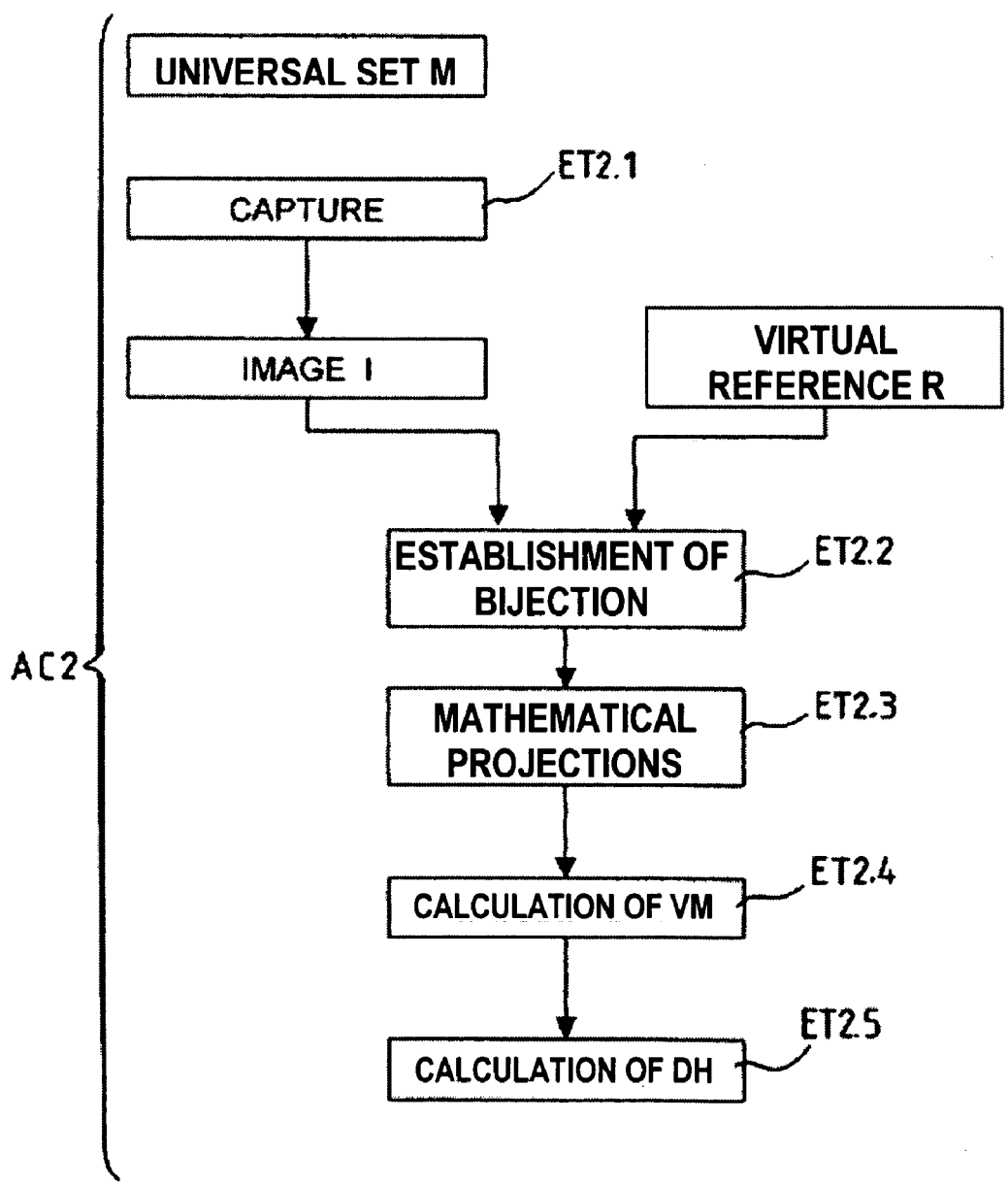
FIG_16a

FIG_16b
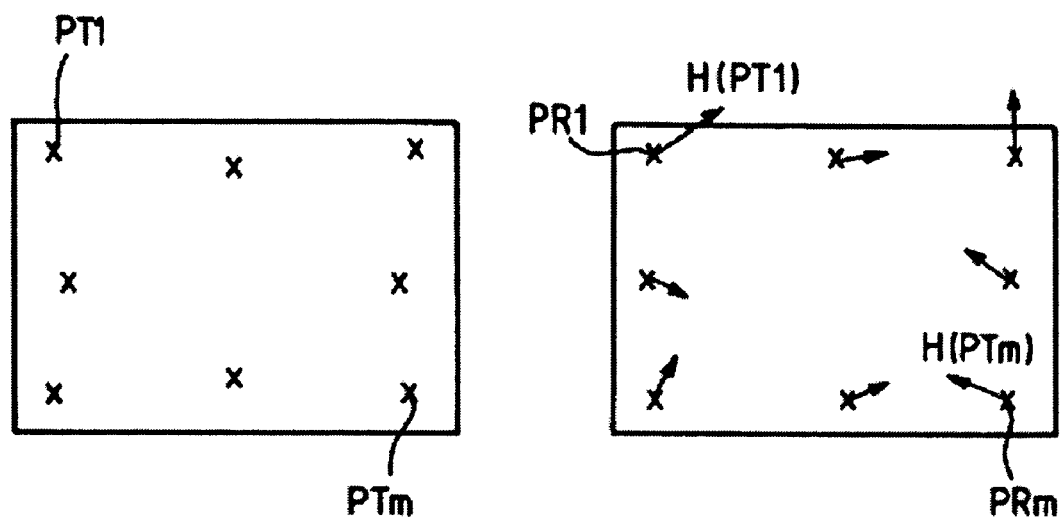
FIG_17
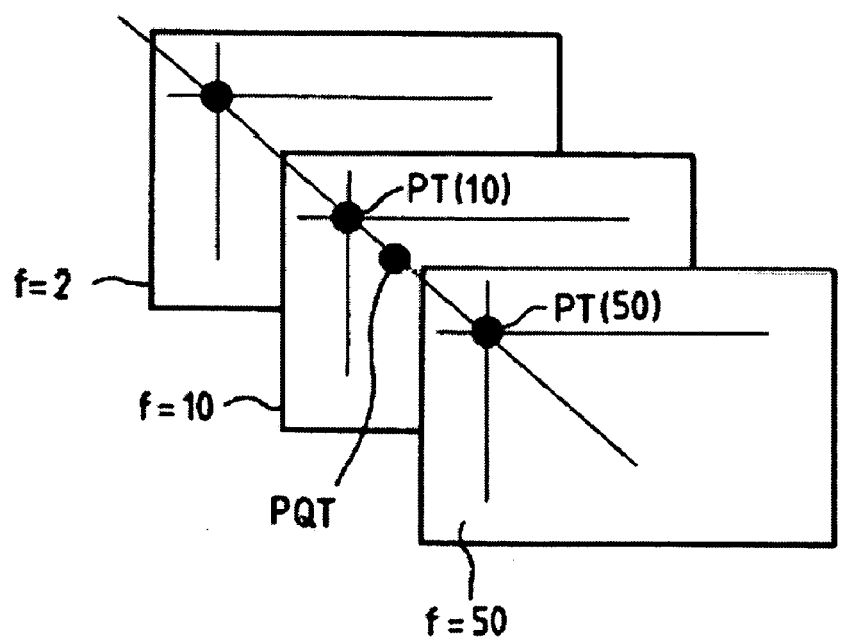

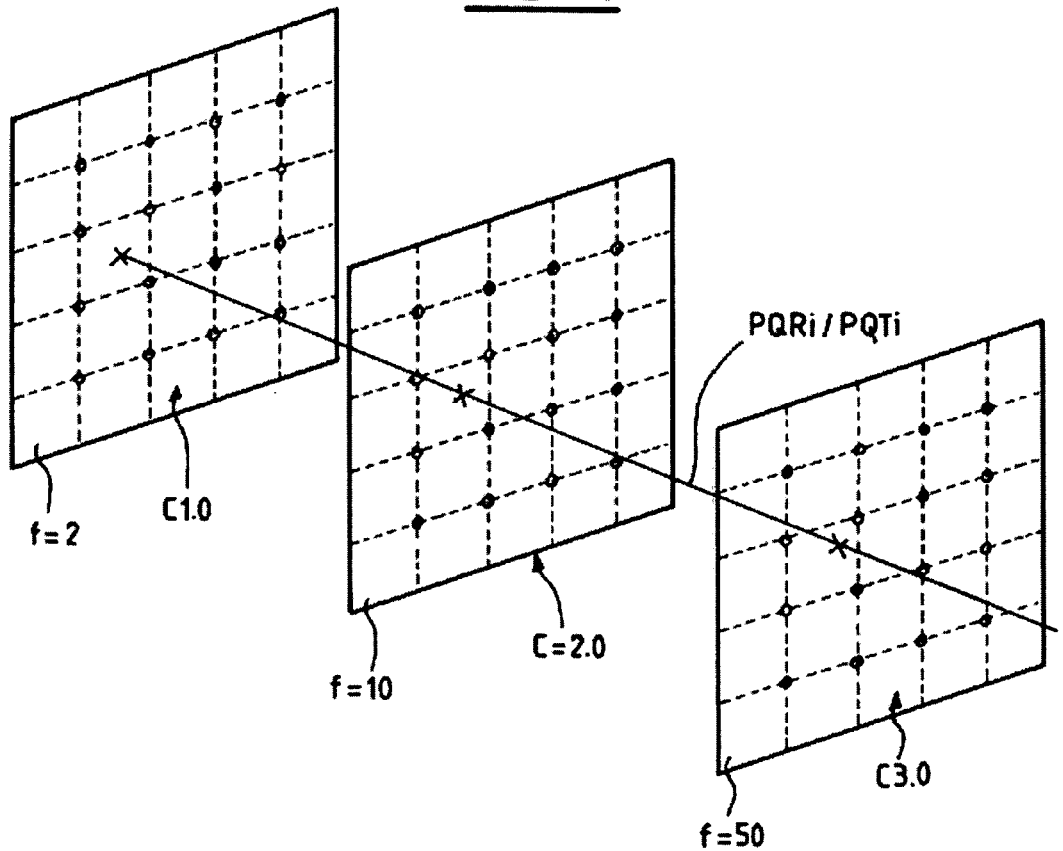
FIG_18
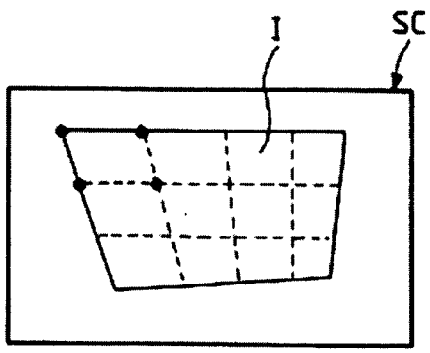
FIG_19b
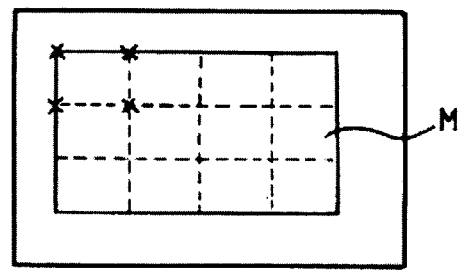
FIG_19a

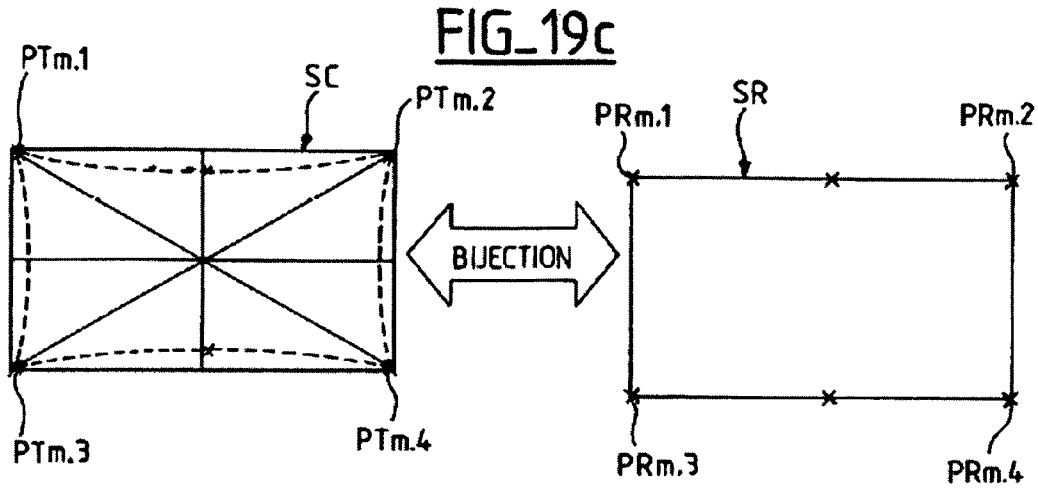
FIG_19c
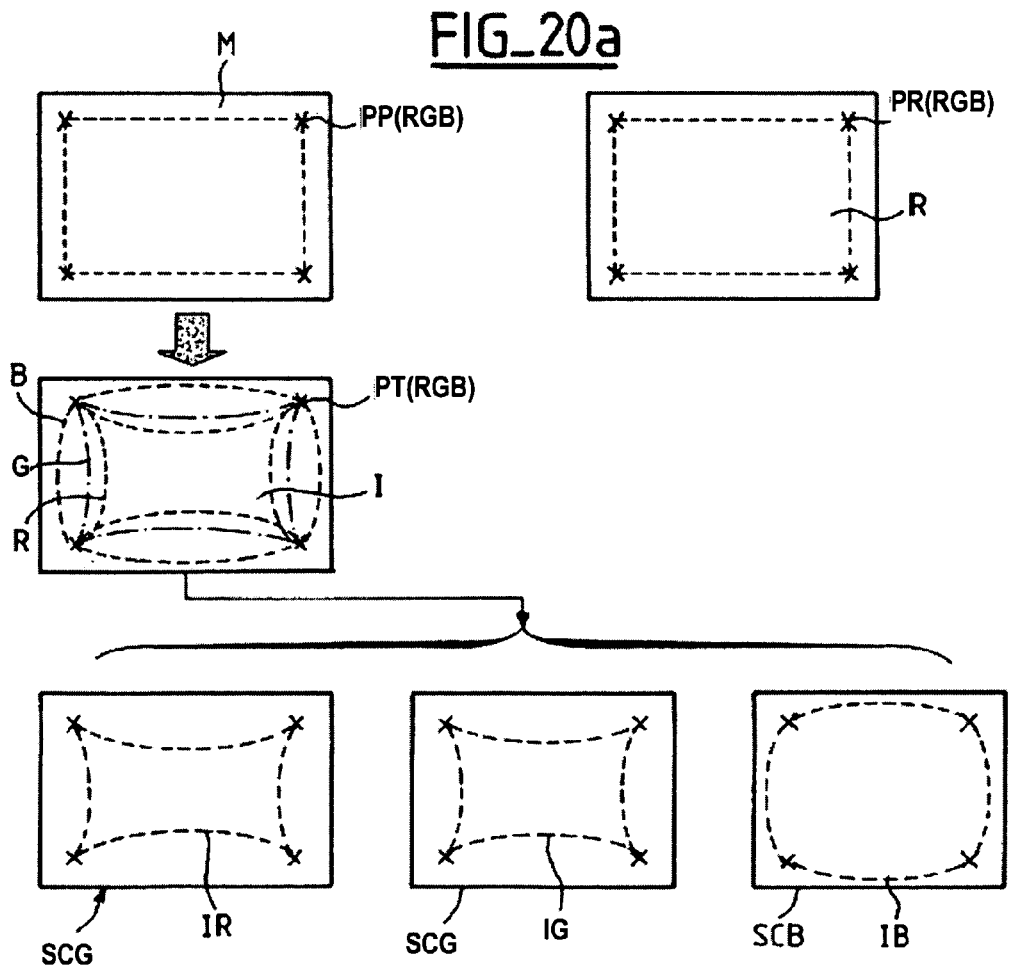
FIG_20a

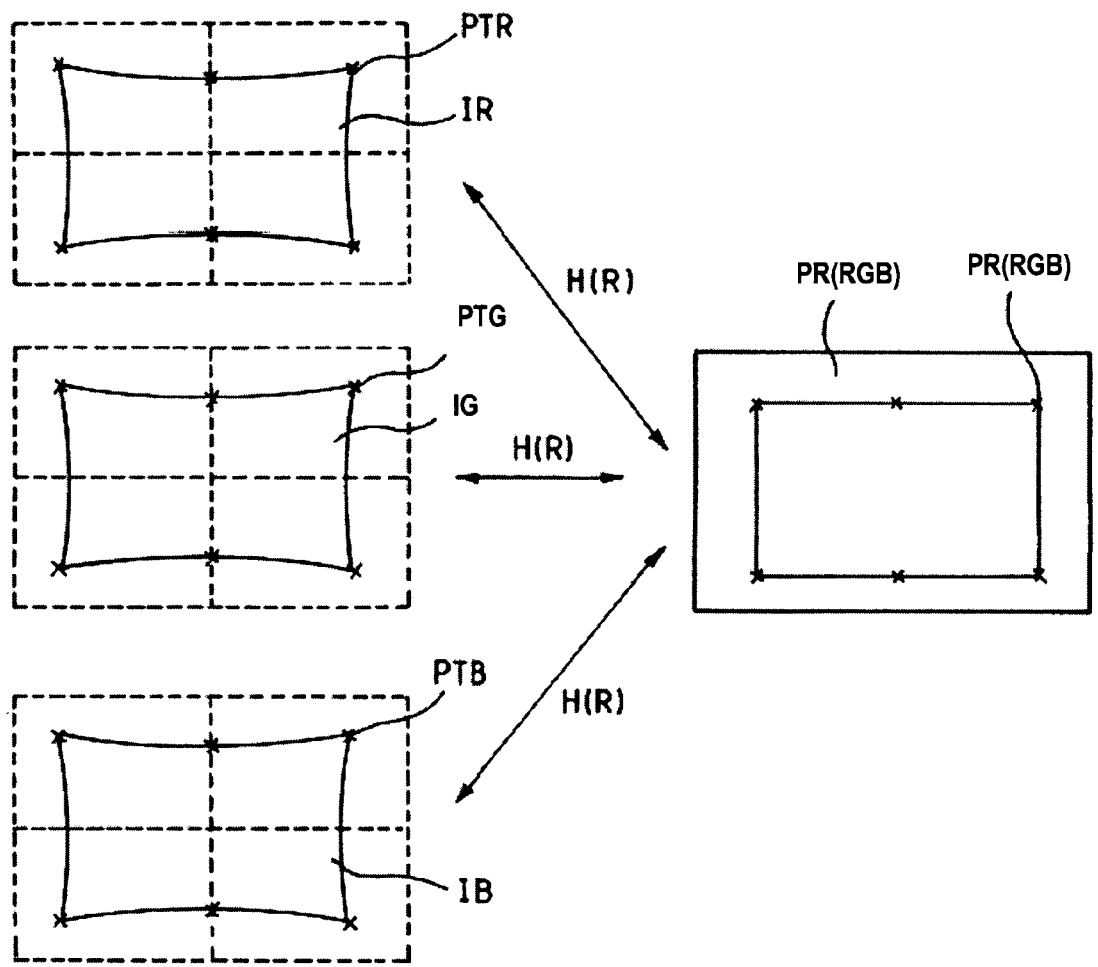
FIG_20b

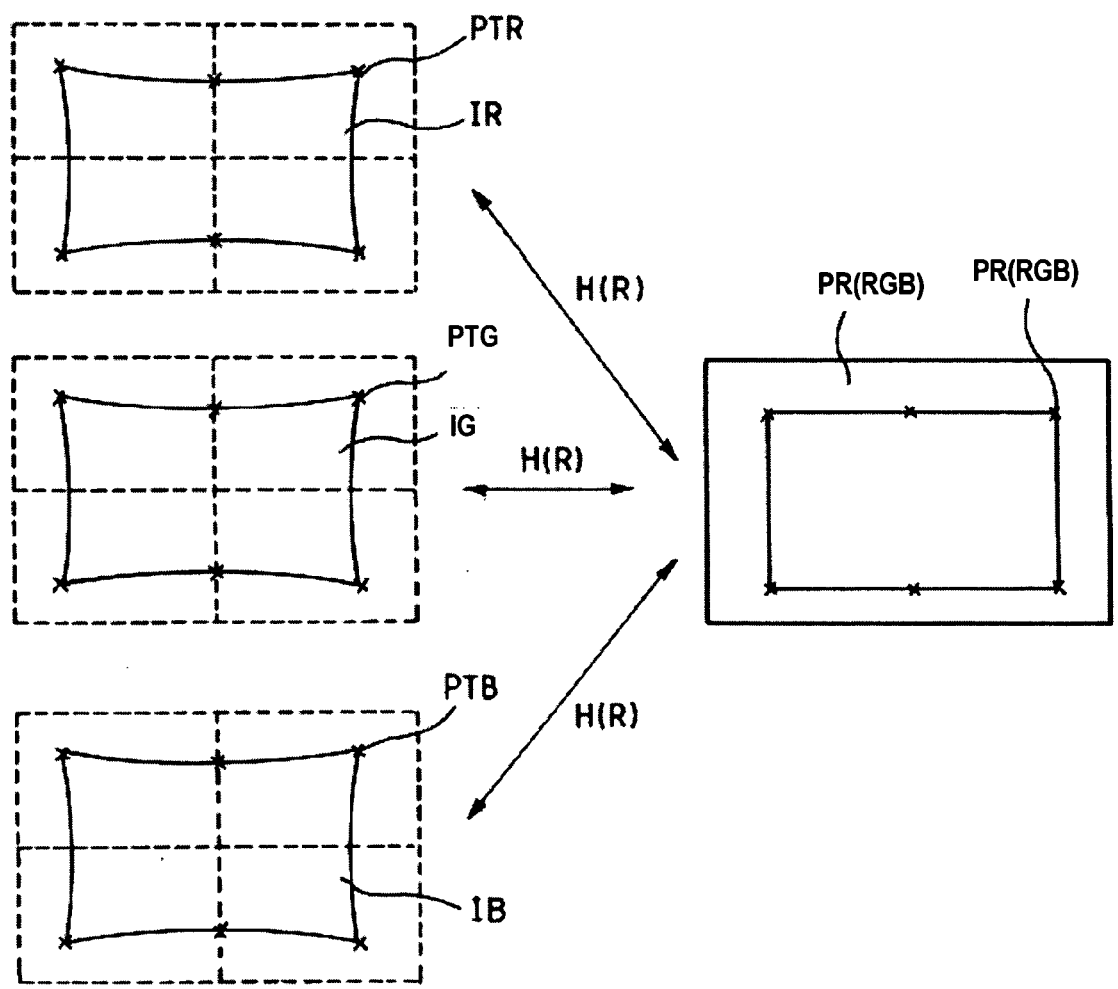
FIG_20c

FIG_20d
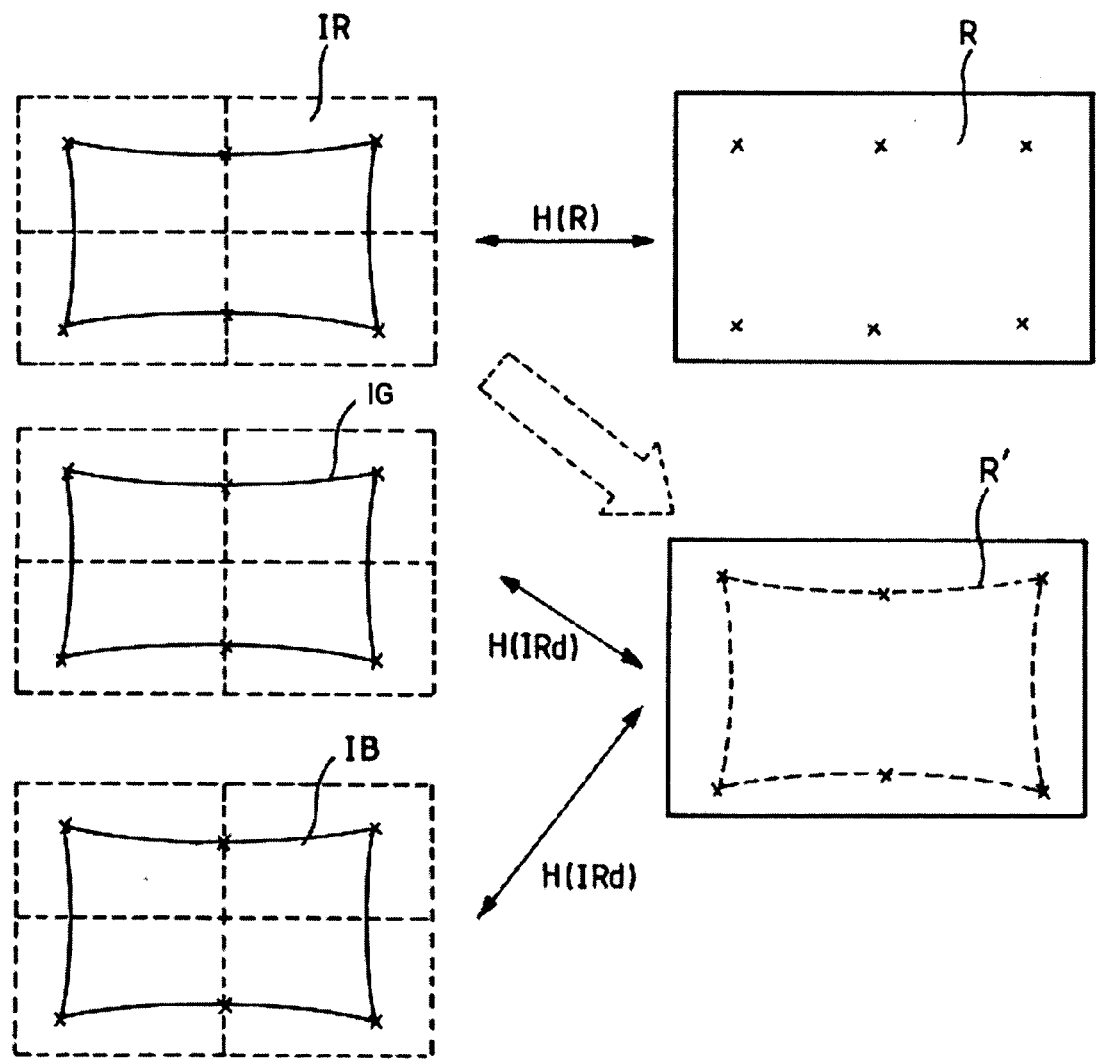

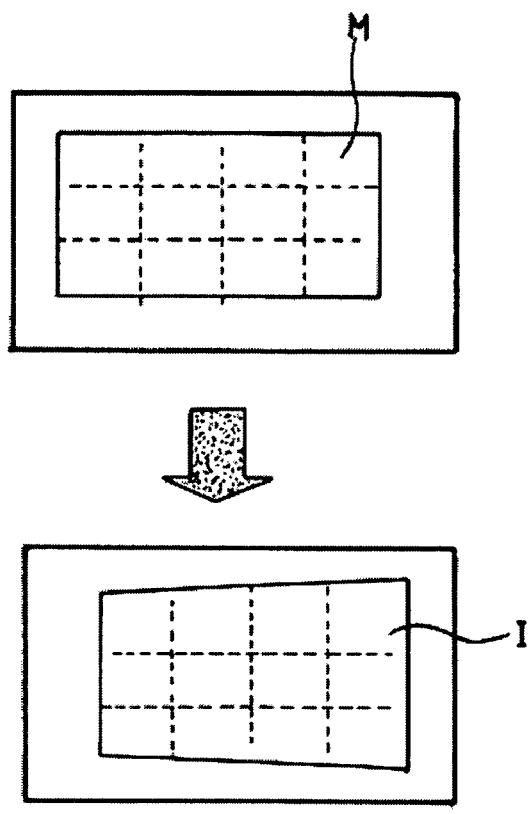
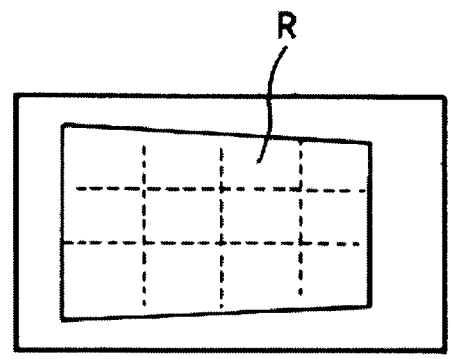
FIG_21
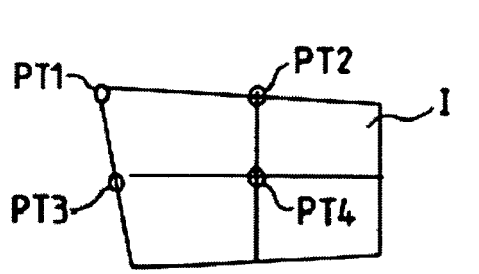
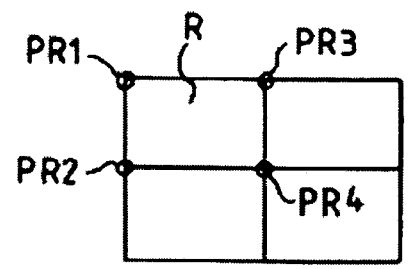
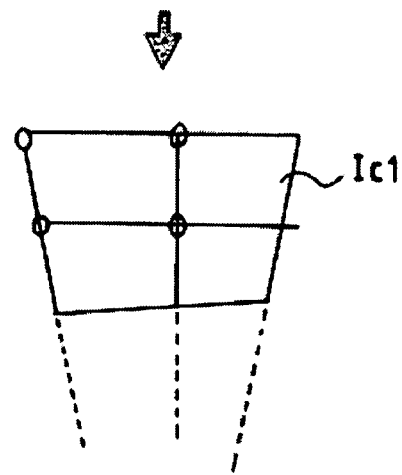
FIG_22

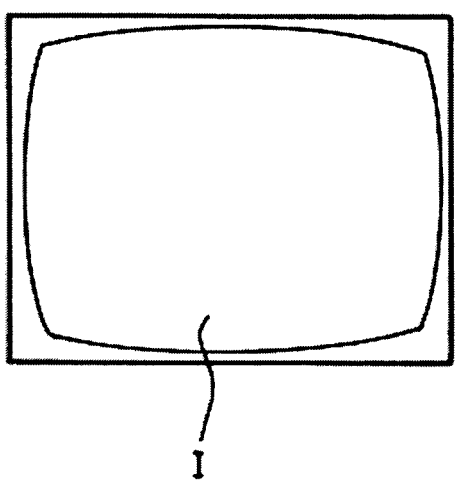
FIG_23a
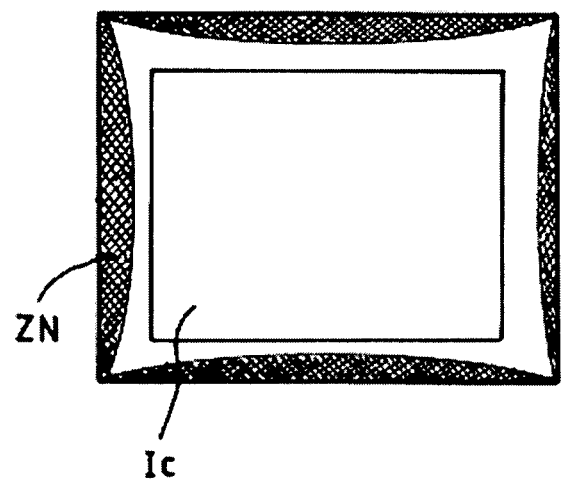
FIG_23b
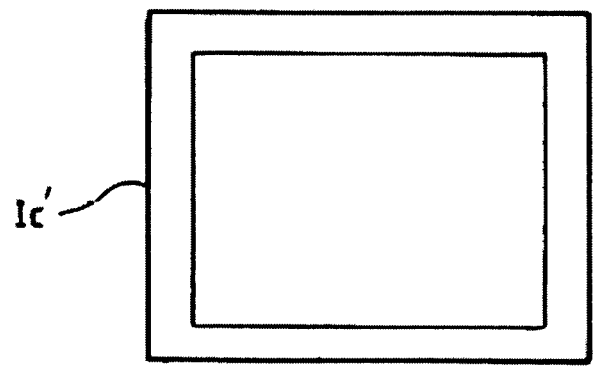
FIG_23c

FIG_24
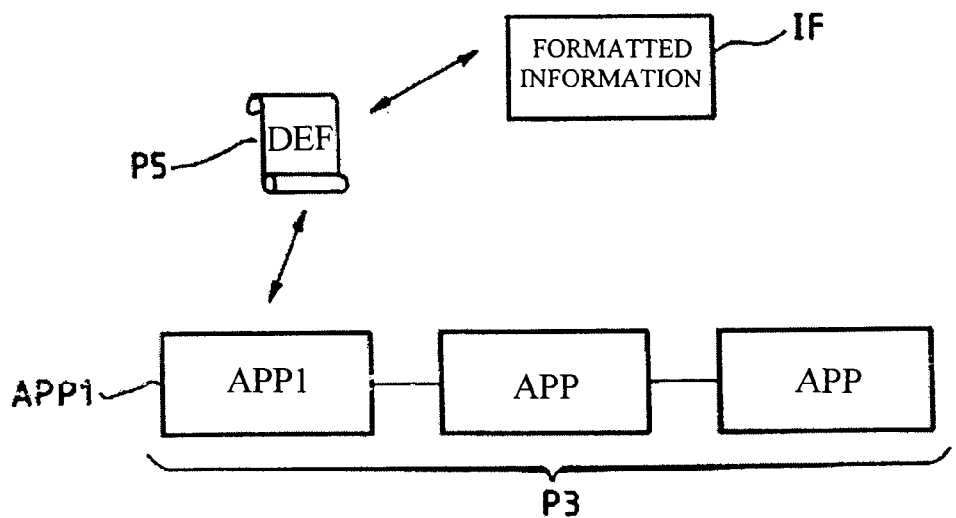
FIG_25
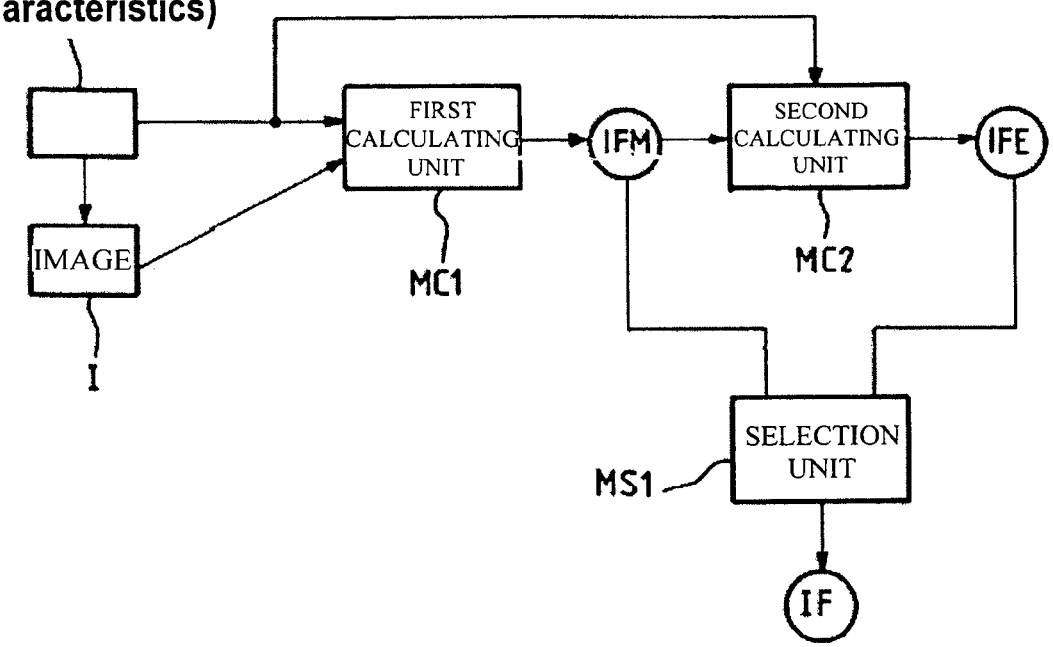

METHOD AND SYSTEM FOR PRODUCING FORMATTED DATA RELATED TO GEOMETRIC DISTORTIONS

FIELD OF THE INVENTION

The present invention relates to a method and a system for producing formatted information related to geometric distortions.

BRIEF SUMMARY OF THE INVENTION

The invention relates to a method for producing formatted information related to the appliances of an appliance chain. The appliance chain includes in particular at least one image-capture appliance and/or at least one image-restitution appliance. The method includes the stage of producing formatted information related to the geometric distortions of at least one appliance of the chain.

Preferably, according to the invention, the appliance is capable of capturing or restituting an image on a medium. The appliance contains at least one fixed characteristic and/or one variable characteristic depending on the image. The fixed characteristic and/or variable characteristic can be associated with one or more values of characteristics, especially the focal length and/or the focusing and their values of associated characteristics. The method includes the stage of producing, from a measured field, measured formatted information related to the geometric distortions of the appliance. The formatted information may include the measured formatted information.

Extended Formatted Information and Deviation

Preferably, according to the invention, the method additionally includes the stage of producing extended formatted information related to the geometric distortions of the appliance from measured formatted information. The formatted information can include the extended formatted information. The extended formatted information exhibits a deviation compared with the said measured formatted information.

Preferably, according to the invention, the method is such that the formatted information produced from the measured formatted information is represented by the parameters of a parameterizable model chosen from among a set of parameterizable models, especially a set of polynomials. The method additionally includes the stage of selecting the parameterizable model within the set of parameterizable models by:

defining a maximum deviation,
ordering the parameterizable models of the set of parameterizable models in accordance with their degree of complexity of employment,
choosing the first of the parameterizable models of the ordered set of parameterizable models in such a way that the deviation is smaller than the maximum deviation.

According to an alternative embodiment of the invention, the extended formatted information may be the measured formatted information.

Preferably, according to the invention, the method includes a first calculation algorithm with which the measured field can be obtained from a universal set containing characteristic points and from a virtual reference composed of reference points on a reference surface. The first calculation algorithm includes the stage of capturing or of restituting the universal set by means of the appliance to produce an image of characteristic points on the medium. The image of a characteristic point is defined hereinafter as the characteristic image point.

The first calculation algorithm additionally includes:
the stage of establishing a bijection between the characteristic image points and the reference points,
the stage of selecting zero or one or more variable characteristics, referred to hereinafter as selected variable characteristics, among the set of variable characteristics.

The measured field is composed of:
the set of pairs composed of one of the reference points and of the characteristic image point associated by the bijection, and of
the value, for the image in question, of each of the selected variable characteristics.

Preferably, according to the invention, the method additionally includes the stage of choosing a mathematical projection, especially a bilinear transformation, between the medium and the reference surface. The measured field is composed of the value, for the image, of each of the selected variable characteristics and, for each reference point:

of the pair composed of the reference point and of the mathematical projection, onto the reference surface, of the characteristic image point associated by the bijection with the reference point, and/or of the pair composed of the characteristic image point associated by the bijection with the reference point, and of the mathematical projection of the reference point onto the medium.

Interpolation to Format an Arbitrary Point

Preferably, according to the invention, the method additionally includes the stage of obtaining, from measured formatted information, the extended formatted information related to an arbitrary reference point on the reference surface and/or related to an arbitrary characteristic image point of the medium, by deducing the formatted information related to the arbitrary reference point or to the arbitrary characteristic image point.

Variable Focal Length

Preferably, according to the invention, the method is such that the appliance of the appliance chain is provided with at least one variable characteristic depending on the image, especially the focal length and/or the focusing. Each variable characteristic is capable of being associated with a value to form a combination composed of the set of variable characteristics and values. The method additionally includes the following stages:

the stage of selecting predetermined combinations,
the stage of calculating measured formatted information, especially by employing the first calculation algorithm for each of the predetermined combinations selected in this way.

Variable Focal Length—Formatting at an Arbitrary Point

An argument is defined, depending on the case, as:
an arbitrary reference point on the reference surface and a combination, or
an arbitrary characteristic image point of the medium and a combination.

Preferably, according to the invention, the method additionally includes the stage of deducing, from measured formatted information, the extended formatted information Choice of a Threshold for the Deviation, and Formatting According to this Threshold Preferably, according to the invention, the method is such that, in order to deduce the extended formatted information from measured formatted information:

a first threshold is defined, the extended formatted information is selected in such a way that the deviation is below the first threshold.

Addition of the Deviations to the Formatted Information

Preferably, according to the invention, the method additionally includes the stage of associating the deviations with the formatted information. It results from the combination of technical features that the formatted information can be used by the software for processing images captured by the appliance in order to obtain images whose residual geometric distortion is known. It results from the combination of technical features that the formatted information can be used by image-processing software to obtain images intended to be restituted by an image-restitution appliance with known residual geometric distortion.

Choice of Bilinear Transformation

Preferably, according to the invention, the method additionally includes the stage of selecting, on the medium, four characteristic image points such that the quadrilateral defined by the four characteristic image points is that having a maximum area and a center of gravity situated in the proximity of the geometric center of the image. The mathematical projection is the bilinear transformation that transforms the four characteristic image points to the reference points associated by bijection with the four characteristic image points. It results from the combination of technical features that it is then possible in simple manner to obtain formatted information that can be used by image-processing software to capture or restitute images with a small change of perspective.

Case of Color Image Distortions

Preferably, according to the invention, the image is a color image composed of a plurality of color planes. The method additionally includes the stage of producing the measured formatted information by employing the first calculation algorithm for at least two of the color planes, by using the same mathematical projection for each of the color planes. In this way it is possible to use the formatted information and/or measured formatted information to correct the distortions and/or the chromatic aberrations of the appliance.

Preferably, according to the invention, the image is a color image composed of a plurality of color planes. The method additionally includes the stage of producing the measured formatted information by employing the first calculation algorithm for at least one of the color planes, by using the same virtual reference for each of the color planes. In this way it is possible to use the formatted information and/or measured formatted information to correct the chromatic aberrations of the appliance.

System

The invention relates to a system for producing formatted information related to the appliances of an appliance chain. The appliance chain includes in particular at least one image-capture appliance and/or at least one image-restitution appliance. The system includes calculating means for producing formatted information related to the geometric distortions of at least one appliance of the chain.

The appliance is capable of capturing or restituting an image on a medium. The appliance contains at least one fixed characteristic and/or one variable characteristic depending on the image. The fixed characteristic and/or variable characteristic can be associated with one or more values of characteristics, especially the focal length and/or the focusing and their values of associated characteristics. Preferably, according to the invention, the system includes calculating means for producing, from a measured field, measured formatted information related to the geometric distortions of the appliance. The formatted information may include the measured formatted information.

Extended Formatted Information and Deviation

Preferably, according to the invention, the system additionally includes calculating means for producing extended formatted information related to the geometric distortions of the appliance from measured formatted information. The formatted information can include the extended formatted information. The extended formatted information exhibits a deviation compared with the measured formatted information.

Concept of Model—Interpolation—Choice of a Threshold and Choice of the Simplest Model for Arriving at the Threshold Preferably, according to the invention, the system is such that the formatted information produced from the measured formatted information is represented by the parameters of a parameterizable model chosen from among a set of parameterizable models, especially a set of polynomials. The system additionally includes selection means for selecting the parameterizable model within the set of parameterizable models. The selection means include data-processing means for:

defining a maximum deviation, ordering the parameterizable models of the set of parameterizable models in accordance with their degree of complexity of employment, choosing the first of the parameterizable models of the ordered set of parameterizable models in such a way that the deviation is smaller than the maximum deviation.

In an alternative embodiment according to the invention, the extended formatted information may be the measured formatted information.

Preferably, according to the invention, the system includes calculation means that employ a first calculation algorithm with which the measured field can be obtained from a universal set containing characteristic points and from a virtual reference composed of reference points on a reference surface. The image-capture appliance or the image-restitution appliance includes means for capturing or means for restituting the universal set, so that an image of characteristic points can be produced on the medium. The image of a characteristic point is defined hereinafter as the characteristic image point.

The calculating means of the first calculation algorithm additionally include data-processing means for:
- establishing a bijection between the characteristic image points and the reference points,
- selecting zero or one or more variable characteristics, referred to hereinafter as selected variable characteristics, among the set of variable characteristics.

The measured field is composed of:
- the set of pairs composed of one of the reference points and of the characteristic image point associated by the bijection, and of
- the value, for the image in question, of each of the selected variable characteristics.

Preferably, according to the invention, the system additionally includes analysis means for choosing a mathematical projection, especially a bilinear transformation, between the medium and the reference surface. For the image, the measured field is composed of the value of each of the selected variable characteristics and, for each reference point, it is composed of:
- the pair composed of the reference point and of the mathematical projection, onto the reference surface, of the characteristic image point associated by the bijection with the reference point, and/or
- of the pair composed of the characteristic image point associated by the bijection with the reference point, and of the mathematical projection of the reference point onto the medium.

Interpolation to Format an Arbitrary Point

Preferably, according to the invention, the system additionally includes data-processing means for obtaining, from measured formatted information, the extended formatted information related to an arbitrary reference point on the reference surface and/or related to an arbitrary characteristic image point of the medium, by deducing the formatted information related to the arbitrary reference point or to the arbitrary characteristic image point.

Variable Focal Length

Preferably, according to the invention, the system is such that the appliance of the appliance chain is provided with at least one variable characteristic depending on the image, especially the focal length and/or the focusing. Each variable characteristic is capable of being associated with a value to form a combination composed of the set of variable characteristics and values. The system additionally includes:
- selection means for selecting predetermined combinations,
- calculating means for calculating measured formatted information, especially by employing the first calculation algorithm for each of the predetermined combinations selected in this way.

Variable Focal Length—Formatting at an Arbitrary Point

An argument is defined, depending on the case, as:
- an arbitrary reference point on the reference surface and a combination, or
- an arbitrary characteristic image point of the medium and a combination.

Preferably, according to the invention, the system additionally includes data-processing means for deducing, from measured formatted information, the extended formatted information related to an arbitrary argument. It results from the combination of technical features that the formatted information is more compact and resistant to measurement errors.

Choice of a Threshold for the Deviation, and Formatting According to this Threshold Preferably, according to the invention, the system is such that the data-processing means for deducing the extended formatted information from measured formatted information include selection means for selecting the extended formatted information in such a way that the deviation is below a first threshold.

Addition of the Deviations to the Formatted Information

Preferably, according to the invention, the deviations are associated with the said formatted information. It results from the combination of technical features that the formatted information can be used by the software for processing images captured by the appliance in order to obtain images whose residual geometric distortion is known. It results from the combination of technical features that the formatted information can be used by image-processing software to obtain images scheduled to be restituted by an image-restitution appliance with known residual geometric distortion.

Choice of Bilinear Transformation

Preferably, according to the invention, the system additionally includes selection means for selecting, on the medium, four characteristic image points such that the quadrilateral defined by the four characteristic image points is that having a maximum area and a center of gravity situated in the proximity of the geometric center of the image. The mathematical projection is the bilinear transformation that transforms the four characteristic image points to associated reference points by bijection at the four characteristic image points. It results from the combination of technical features that it is then possible in simple manner to obtain formatted information that can be used by image-processing software to capture or restitute images with a small change of perspective.

Case of Color Image Distortions

The image is a color image composed of a plurality of color planes. Preferably, according to the invention, the system additionally includes data-processing means for producing the measured formatted information by employing the first calculation algorithm for at least two of the color planes, by using the same mathematical projection for each of the color planes. In this way it is possible to use the formatted information and/or measured formatted information to correct the distortions and/or the chromatic aberrations of the appliance.

Preferably, according to the invention, the image is a color image composed of a plurality of color planes. The system additionally includes data-processing means for producing the measured formatted information by employing the first calculation algorithm for at least one of the color planes, by using the same virtual reference for each of the color planes. In this way it is possible to use the formatted information and/or measured formatted information to correct the chromatic aberrations of the appliance.

BRIEF DESCRIPTION OF THE SEVERAL VIEWS OF THE DRAWINGS

Other characteristics and advantages of the invention will become apparent upon reading of the description of alternative embodiments of the invention, provided by way of indicative and non-limitative examples, and of the figures, wherein respectively:

FIG. 5 illustrates the organizational diagram of the method with which the difference between the mathematical image and the corrected image can be calculated, FIG. 6 illustrates the organizational diagram of the method with which the best restitution transformation for an image-restitution means can be obtained, FIGS. 13a and 13b illustrate diagrams with which the production of a measured field by using bijections can be explained, FIGS. 14a and 14b illustrate diagrams with which the production of a measured field by using bijections and mathematical projections can be explained, FIGS. 15a and 15b illustrate a method in which the measured field is produced in the form of a polynomial, FIGS. 16a and 16b illustrate an alternative version of a method of calculating a measured field, FIGS. 17 and 18 illustrate methods of interpolation of the formatted information of a point from known formatted information, FIGS. 19a to 19c illustrate alternative versions of the method, with which versions the number of points of calculation of the measured field can be minimized, FIGS. 20a to 20d illustrate a method with which the formatted information related to a color image can be calculated, FIG. 21 illustrates a method related to correction of an image that has been deformed by a projection, FIG. 22 illustrates an alternative version of the method, with which version the number of points of calculation can be minimized in the case of correction of a geometric distortion, FIGS. 23a to 23c illustrate a method with which unprocessed zones of a corrected image can be eliminated, FIG. 24 illustrates formatted information related to the geometric distortions of an appliance APP1 of an appliance chain P3, FIG. 25 illustrates a practical embodiment of a system according to the invention.

DETAILED DESCRIPTION OF THE INVENTION

Figure 1:
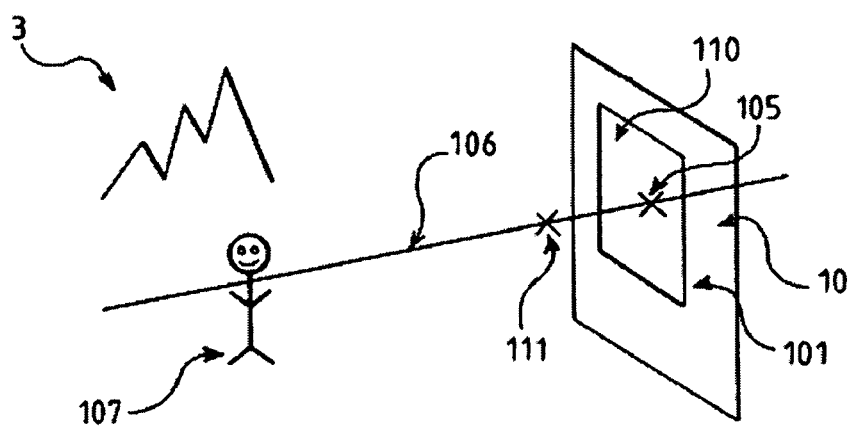
FIG. 1 illustrates a schematic view of image capture.

FIG. 1 illustrates a scene 3 containing an object 107, a sensor 101 and sensor surface 110, an optical center 111, an observation point 105 on a sensor surface 110, an observation direction 106 passing through observation point 105, optical center 111, scene 3, and a surface 10 geometrically associated with sensor surface 110.

Figure 2:
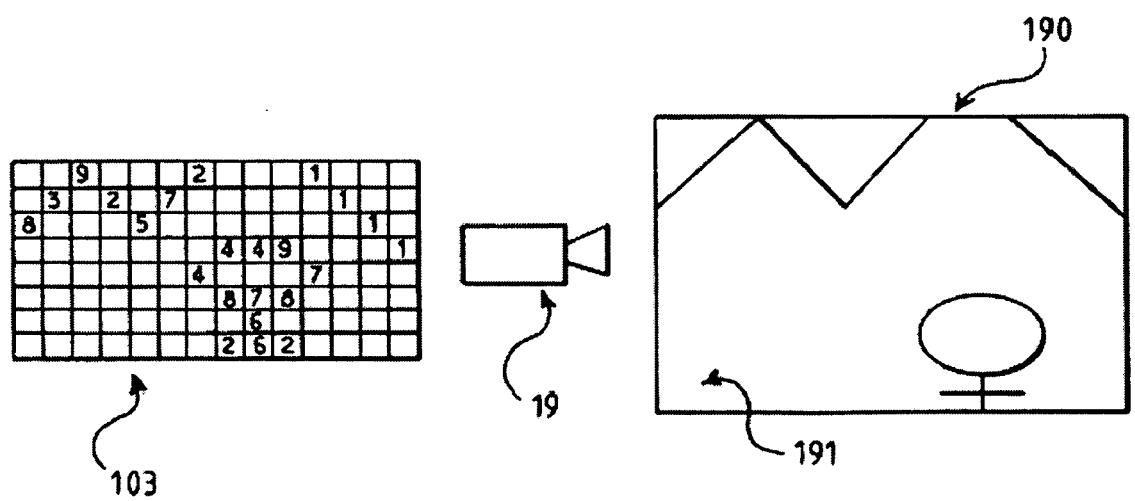
FIG. 2 illustrates a schematic view of image restitution.

FIG. 2 illustrates an image 103, an image-restitution means 19 and a restituted image 191 obtained on the restitution medium 190.

Figure 3:
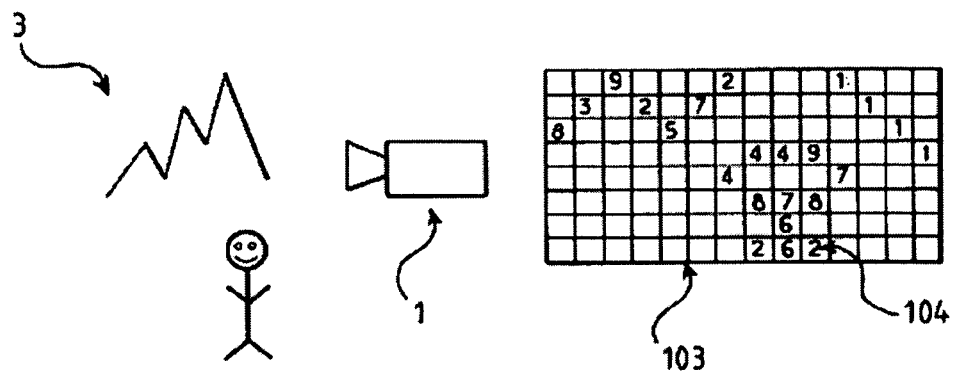
FIG. 3 illustrates a schematic view of the pixels of an image.

FIG. 3 illustrates a scene 3, an image-capture appliance 1 and an image 103 composed of pixels 104.

Figure 4A:
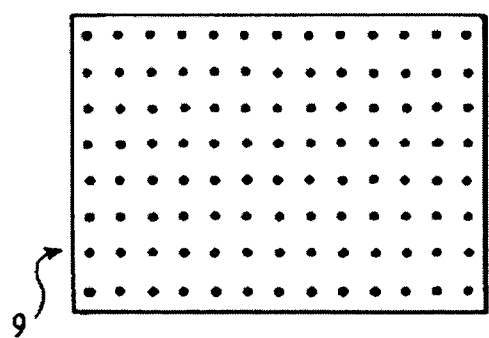
FIGS. 4a and 4b illustrate two schematic views of a reference scene.
Figure 4B:
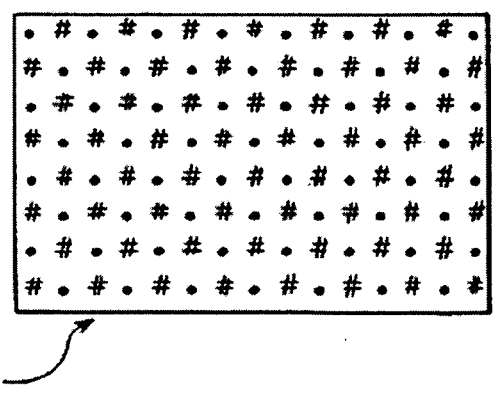

FIGS. 4a and 4b illustrate two alternative versions of a reference scene 9.

FIG. 5 illustrates an organizational diagram employing a scene 3, a mathematical projection 8 giving a mathematical image 70 of scene 3, a real projection 72 giving an image 103 of scene 3 for the characteristics 74 used, a parameterizable transformation model 12 giving a corrected image 71 of image 103, the corrected image 71 exhibiting a difference 73 compared with mathematical image 70.

FIG. 6 illustrates an organizational diagram employing an image 103, a real restitution projection 90 giving a restituted image 191 of image 103 for the restitution characteristics 95 used, a parameterizable restitution transformation model 97 giving a corrected restitution image 94 of image 103, a mathematical restitution projection 96 giving a mathematical restitution image 92 of corrected restitution image 94 and exhibiting a restitution difference 93 compared with restituted image 191.

Figure 7:
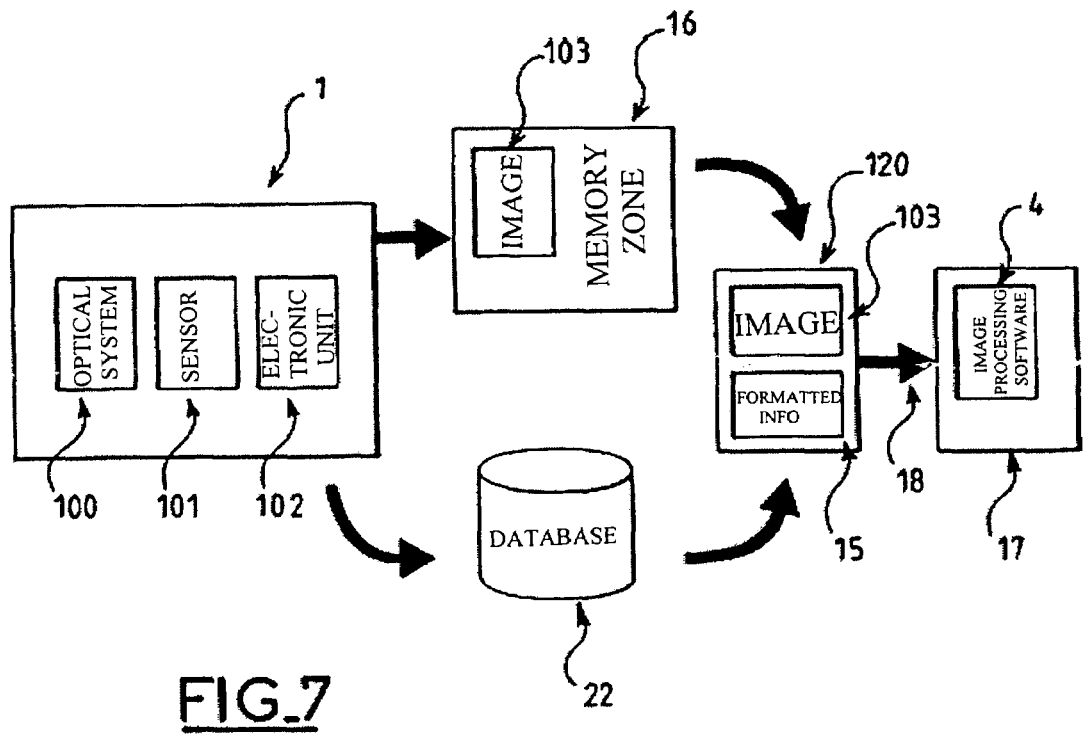
FIG. 7 illustrates a schematic view of the elements composing the system according to the invention.

FIG. 7 illustrates a system comprising an image-capture appliance 1 composed of an optical system 100, of a sensor 101 and of an electronic unit 102. FIG. 7 also illustrates a memory zone 16 containing an image 103, a database 22 containing formatted information 15, and means 18 for transmission of completed image 120 composed of image 103 and formatted information 15 to calculating means 17 containing image-processing software 4.

Figure 8:
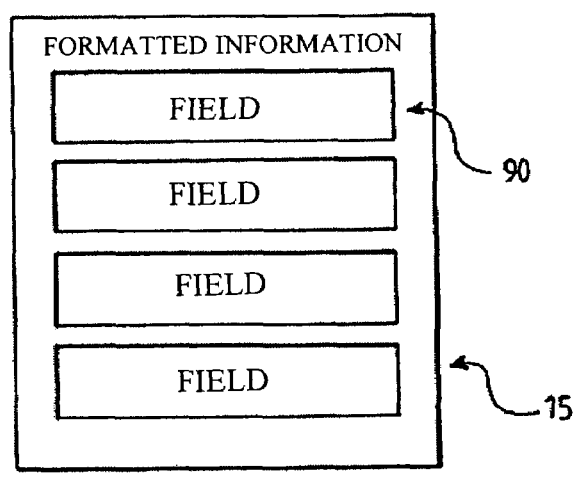
FIG. 8 illustrates a schematic view of fields of formatted information.
Figure 9A:
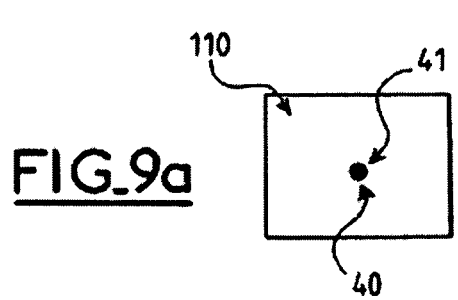
FIG. 9a illustrates a schematic front view of a mathematical point.
Figure 9B:
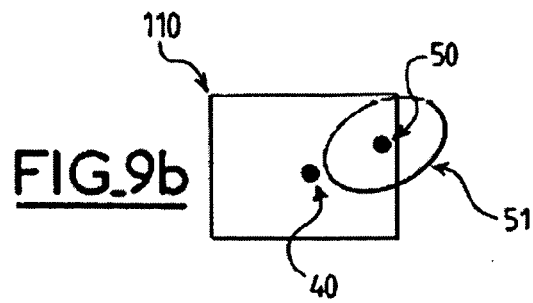
FIG. 9b illustrates a schematic front view of a real point of an image.
Figure 9C:
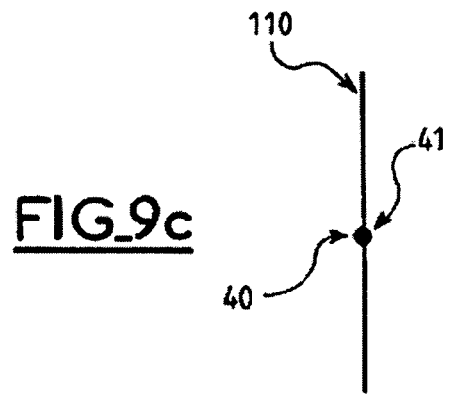
FIG. 9c illustrates a schematic side view of a mathematical point.
Figure 9D:
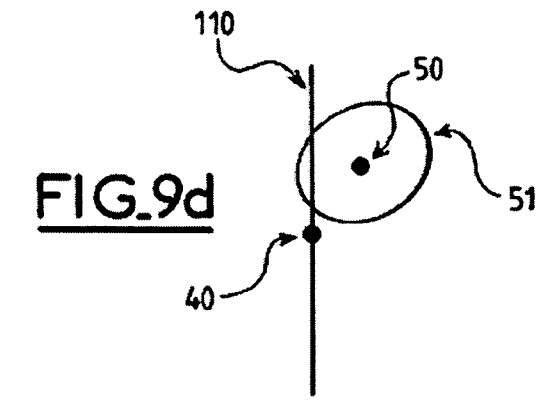
FIG. 9d illustrates a schematic profile view of a real point of an image.

FIG. 8 illustrates formatted information 15 composed of fields 90.

FIGS. 9a to 9d illustrate a mathematical image 70, an image 103, the mathematical position 40 of a point, and the mathematical shape 41 of a point, compared with the real position 50 and the real shape 51 of the corresponding point of the image.

Figure 10:
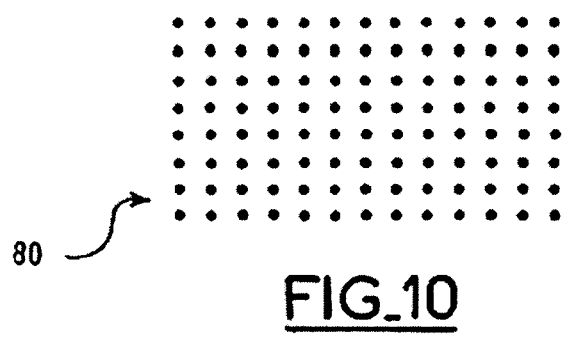
FIG. 10 illustrates a schematic view of an array of characteristic points.

FIG. 10 illustrates an array 80 of characteristic points.

Figure 11:
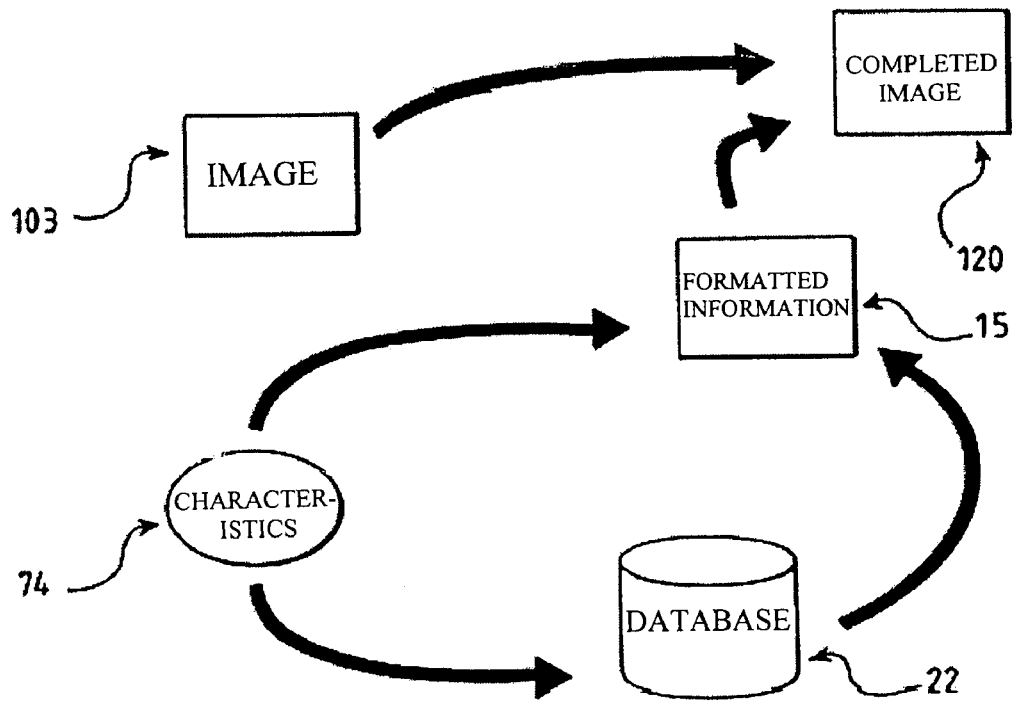
FIG. 11 illustrates the organizational diagram of the method with which the formatted information can be obtained.

FIG. 11 illustrates an organizational diagram employing an image 103, the characteristics 74 used, and a database 22 of characteristics. The formatted information 15 is obtained from the characteristics 74 used and stored in database 22. The completed image 120 is obtained from image 103 and formatted information 15.

Figure 12:
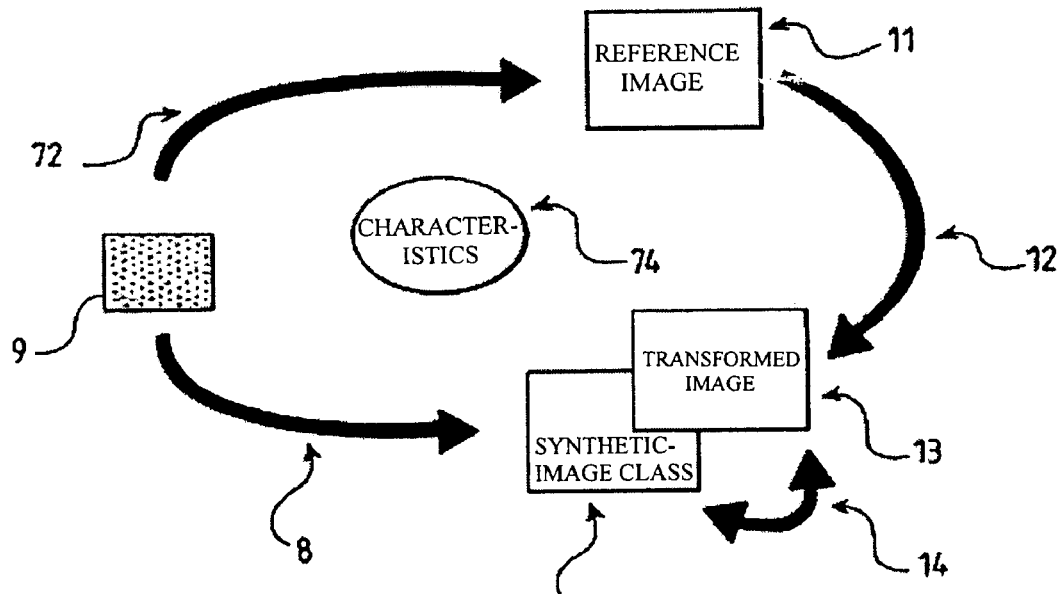
FIG. 12 illustrates the organizational diagram of the method with which the best transformation for an image-capture appliance can be obtained.

FIG. 12 illustrates an organizational diagram employing a reference scene 9, a mathematical projection 8 giving a synthetic image class 7 of reference scene 9, and a real projection 72 giving a reference image 11 of reference scene 9 for the characteristics 74 used. This organizational diagram also employs a parameterizable transformation model 12 giving a transformed image 13 of reference image 11. Transformed image 13 exhibits a deviation 14 compared with synthetic image class 7.

Appliance

Referring in particular to FIGS. 2, 3 13a, 13b and 24, a description will be given of the concept of appliance APP1. Within the meaning of the invention, an appliance APP1 may be in particular:
- an image-capture appliance 1, as shown on FIG. 3 or an image-capture appliance as shown on FIG. 13a, such as a disposable photo appliance, a digital photo appliance, a reflex appliance, a scanner, a fax machine, an endoscope, a camcorder, a surveillance camera, a webcam, a camera integrated into or connected to a telephone, to a personal digital assistant or to a computer, a thermal camera or an echographic appliance,
- an image-restitution appliance APP2 as illustrated on FIG. 13b or image-restitution means 19, as illustrated on FIG. 2, such as a screen, a projector, a television set, virtual-reality goggles or a printer,
- a human being having vision defects, for example astigmatism,
- an appliance which it is hoped can be emulated, to produce images having, for example, an appearance similar to those produced by an appliance of the Leica brand,
- an image-processing device, such as zoom software, which has the edge effect of adding blurring,
- a virtual appliance equivalent to a plurality of appliances APP1, A more complex appliance APP1, such as a scanner/fax/printer, a photo-printing Minilab, or a videoconferencing appliance can be regarded as an appliance APP1 or as a plurality of appliances APP1.

Appliance Chain

Referring in particular to FIG. 24, a description will now be given of the concept of appliance chain P3. An appliance chain P3 is defined as a set of appliances APP1. The concept of appliance chain P3 may also include a concept of order.

The following examples constitute appliance chains P3:
- a single appliance APP1,
- an image-capture appliance and an image-restitution appliance,
- a photo appliance, a scanner or a printer, for example in a photo-printing Minilab,
- a digital photo appliance or a printer, for example in a photo-printing Minilab,
- a scanner, a screen or a printer, for example in a computer,
- a screen or projector, and the eye of a human being,
- one appliance and another appliance which it is hoped can be emulated,
- a photo appliance and a scanner,
- an image-capture appliance and image-processing software,
- image-processing software and an image-restitution appliance,
- a combination of the preceding examples,
- another set of appliances APP1.

Defect

Referring in particular to FIG. 24, a description will now be given of the concept of defect P5. A defect P5 of appliance APP1 is defined as a defect related to the characteristics of the optical system and/or of the sensor and/or of the electronic unit and/or of the software integrated in an appliance APP1; examples of defects P5 include geometric distortion, blurring, vignetting, chromatic aberrations rendering of colors, flash uniformity, sensor noise, grain, astigmatism and spherical aberration.

Image

Referring in particular to FIG. 13a, a description will now be given of the concept of image I. Image I is defined as an image captured or modified or restituted by an appliance APP1. Image I may originate from an appliance APP1 of appliance chain P3. Image I may be addressed to an appliance APP1 of appliance chain P3. In the case of animated images, such as video images, composed of a time sequence of fixed images, image I is defined as one fixed image of the sequence of images.

Formatted Information

Referring in particular to FIG. 24, a description will now be given of the concept of formatted information IF. Formatted information IF is defined as data related to the defects P5 of one or more appliances APP1 of appliance chain P3 and making it possible to calculate a transformed image by taking into account the defects P5 of the appliance APP1. To produce the formatted information IF, there may be used various methods based on measurements, and/or captures or restitution of references, and/or simulations.

To produce the formatted information IF, it is possible, for example, to use the method described in the International Patent Application filed on the same day as the present application in the name of Vision IQ and entitled "Method and system for reducing update frequency of image processing means". That application describes a method for reducing the update frequency of image-processing means, in particular software and/or a component. The image-processing means make it possible to modify the quality of the digital images derived from or addressed to an appliance chain. The appliance chain is composed in particular of at least one image-capture appliance and/or at least one image-restitution appliance. The image-processing means employ formatted information related to the defects of at least one appliance of the appliance chain. The formatted information IF depends on at least one variable. The formatted information makes it possible to establish a correspondence between one part of the variables and of the identifiers. By means of the identifiers it is possible to determine the value of the variable corresponding to the identifier by taking the identifier and the image into account. It results from the combination of technical features that it is possible to determine the value of a variable, especially in the case in which the physical significance and/or the content of the variable are known only after distribution of the image-processing means. It also results from the combination of technical features that the time between two updates of the correction software can be spaced apart. It also results from the combination of technical features that the various economic players that produce appliances and/or image-processing means can update their products independently of other economic players, even if the latter radically change the characteristics of their product or are unable to force their client to update their products. It also results from the combination of technical features that a new functionality can be deployed progressively by starting with a limited number of economic players and pioneer users.

To produce the formatted information IF, there may be used, for example, the method described in the International Patent Application filed on the same day as the present application and entitled "Method and system for providing formatted information to image-processing means, according to a standard format." That application describes a method for providing formatted information IF to image-processing means, in particular software and/or components, according to a standard format. The formatted information IF is related to the defects of an appliance chain P3. The appliance chain P3 comprises in particular at least one image-capture appliance 1 and/or an image-restitution appliance 19. The image-processing means use the formatted information IF to modify the quality of at least one image derived from or addressed to the appliance chain P3. The formatted information IF comprises data characterizing the defects P5 of the image-capture appliance 1, in particular the distortion characteristics, and/or data characterizing the defects of the image-restitution appliance 19, in particular the distortion characteristics.

The method includes the stage of filling in at least one field of the standard format with the formatted information IF. The field is designated by a field name, the field containing at least one field value.

To use the formatted information IF, it is possible, for example, to use the method described in the International Patent Application filed on the same day as the present application in the name of Vision IQ and entitled "Method and system for modifying the quality of at least one image derived from or addressed to an appliance chain". That application describes a method for modifying the quality of at least one image derived from or addressed to a specified appliance chain. The specified appliance chain is composed of at least one image-capture appliance 1 and/or at least one image-restitution appliance. The image-capture appliances 1 and/or the image-restitution 19 appliances 19 being progressively introduced on the market by separate economic players belong to an indeterminate set of appliances. The appliances APP1 of the set of appliances exhibit defects P5 that can be characterized by the formatted information. For the image in question, the method includes the following stages:
  the stage of compiling directories of the sources of formatted information related to the appliances of the set of appliances,
  the stage of automatically searching for specific formatted information related to the specified appliance chain among the formatted information compiled in this way,
  the stage of automatically modifying the image I by means of image-processing software and/or image-processing components, while taking into account the specific formatted information obtained in this way.

To use the formatted information IF, it is possible, for example, to use the method described in the International Patent Application filed on the same day as the present application in the name of Vision IQ and entitled "Method and system for calculating a transformed image from a digital image and formatted information related to a geometric transformation". That application describes a method for calculating a transformed image from a digital image and formatted information IF related to a geometric transformation, especially formatted information IF related to the distortions and/or chromatic aberrations of an appliance chain. The method includes the stage of calculating the transformed image from an approximation of the geometric transformation. It results therefrom that the calculation is economical in terms of memory resources, in memory bandpass, in calculating power and therefore in electricity consumption. It also results therefrom that the transformed image does not exhibit any visible or annoying defect as regards its subsequent use.

To use the formatted information IF, it is possible, for example, to use the method described in the International Patent Application filed on the same day as the International Patent Application for this invention under number WO 2002FR01913 in the name of Vision IQ entitled: Method and system for correcting the chromatic aberrations of a color image constructed by means of an optical system. In this patent, there is described a method for correcting the chromatic aberrations of a color image composed of a plurality of digitized color planes. The color image was constructed by means of an optical system. The method includes the following stages:
  the stage of modeling and of correcting, at least in part, the geometric anomalies of the digitized color planes, in such a way as to obtain corrected digitized color planes,
  the stage of combining the corrected digitized color planes, in such as way as to obtain a color image corrected, in whole or in part, for chromatic aberrations.

Variable Characteristic

A description will now be given of the concept of variable characteristic. According to the invention, a variable characteristic is defined as a measurable factor, which is variable from one image I to another that has been captured, modified or restituted by the same appliance APP1, and which has an influence on defect P5 of the image that has been captured, modified or restituted by appliance APP1, especially:
  a global variable, which is fixed for a given image I, an example being a characteristic of appliance APP1 at the moment of capture or restitution of the image, related to an adjustment of the user or related to an automatic function of appliance APP1,
  a local variable, which is variable within a given image I, an example being coordinates x, y or rho, theta in the image, making it possible to apply, if need be, local processing that differs depending on the zone of the image I.

A measurable factor which is variable from one appliance APP1 to another but which is fixed from one image I to another that has been captured, modified or restituted by the same appliance APP1 is not generally considered to be a variable characteristic. An example is the focal length for an appliance APP1 with fixed focal length.

The formatted information IF may depend on at least one variable characteristic.

By variable characteristic there can be understood in particular:
  the focal length of the optical system,
  the redimensioning applied to the image (digital zoom factor: enlargement of part of the image; and/or undersampling: reduction of the number of pixels of the image),
  the nonlinear brightness correction, such as the gamma correction,
  the enhancement of contour, such as the level of deblurring applied by appliance APP1,
  the noise of the sensor and of the electronic unit,
  the aperture of the optical system,
  the focusing distance,
  the number of the frame on a film,
  the underexposure or overexposure,
  the sensitivity of the film or sensor,
  the type of paper used in a printer,
  the position of the center of the sensor in the image,
  the rotation of the image relative to the sensor,
  the position of a projector relative to the screen, the white balance used,
the activation of a flash and/or its power,
the exposure time,
the sensor gain,
the compression,
the contrast,
another adjustment applied by the user of appliance APP1, such as a mode of operation,
another automatic adjustment of appliance APP1,
another measurement performed by appliance APP1.

Value of a Variable Characteristic

A description will now be given of the concept of value of a variable characteristic. The value of a variable characteristic is defined as the value of the variable characteristic at the moment of capture, modification or restitution of a specified image.

Parameterizable Model

Within the meaning of the invention, a parameterizable model or parameterizable transformation model or parameterizable transformation is defined as a mathematical model that can depend on variable characteristics related to one or more defects P5 of one or more appliances APP1. The formatted information IF related to a defect P5 of an appliance may be presented in the form of parameters of a parameterizable model that depends on variable characteristics.

Formatted Information Related to Geometric Distortions

FIG. 13a illustrates an organizational diagram employing:
a universal set M, which may be the foregoing reference scene 9,
a medium SC containing an image. In the case of an image-capture system, surface SC may be that of a sensor (such as a CCD) or, in the case of an image-restitution system, this surface may be that of a projection screen or that of a paper sheet of a printer.
a virtual reference surface SR (equivalent to the foregoing surface 10), containing a virtual reference R or a virtual reference image, which may be a synthetic image of synthetic-image class 7 in the foregoing.

By means of an appliance APP1 or of an appliance chain P3, image I (defined as reference image 11 in the foregoing) is obtained, from universal set M, on a medium SC, which may be a sensor surface. An appliance chain is a set of appliances with which an image can be obtained. For example, an appliance chain App1/App2/App3 will be able to include an image-capture appliance, a scanner, a printing appliance, etc.

Image I therefore contains defects P5 and, in particular, geometric distortions related to these appliances APP1.

Virtual reference R is deduced directly from M, and must be regarded as perfect or quasi-perfect. It may be identical or quasi-identical to M, or instead may exhibit differences, as will be seen farther on.

As an example, we can explain the relationship between universal set M and reference surface R as follows: To points PP1 to PPm of universal set M there correspond reference points PR1 to PRm in virtual reference R of reference surface SR as well as characteristic image points PT1 to PTm of image I of medium SC.

According to a practical example of the invention, there is therefore provided a stage of construction of image I by means of appliance APP1 or of appliance chain P3.

In the course of a subsequent stage, there is chosen a certain number of points PTi, PRi. These points are chosen in limited numbers and are situated in characteristic zones of universal set M, of image I and of virtual reference R. A bijection is then established between the points PTi of the image and the points PRi of the virtual reference. Thus, to each chosen point PTi there is made to correspond a corresponding point PRi, and vice versa.

In the course of another stage, it is possible but not necessary to choose variable characteristics of the appliance APP1 (or of the appliance chain) among those used to obtain image I with appliance APP1. The variable characteristics of an appliance or of an appliance chain can include the focal length of the optical system of an appliance, the focus, the aperture, the number of the photo in a set of photos, the digital zoom, and the characteristics of partial capture of an image ("crop" in English terminology), etc.

The following information set comprises a measured field DH with which, for correction of an image, it will be possible subsequently to use:
the bijection, or in other words the set of pairs of points Pti and PRi that have been chosen and that correspond via the foregoing bijection,
the set of chosen variable characteristics.

By means of this information, which comprises a measurement field, it will be possible to obtain measured formatted information.

In an alternative embodiment, it is possible to use software that simulates the appliance, especially optical simulation software, or to use an optical measuring bench to calculate the points PTi from the points PPi of universal set M or from the points PPi of a model of universal set M.

FIG. 14a illustrates another form of obtaining a measured field.

This FIG. 14a shows universal set M, reference surface SR and medium SC.

As in the foregoing, image I is constructed on medium SC by means of an appliance APP3. Then the bijection described in the foregoing is applied.

A mathematical projection, preferably a bilinear transformation, is then established between a point of medium SC and a point of reference surface SR.

In FIG. 14b it is seen that, for each point PRj of the reference surface, there can be obtained a point H(PRj) of the image by mathematical projection. Preferably, for two points PRj and PTj of a pair associated by bijection, there is a point H(PRj), the mathematical projection of PRj onto medium SC.

Under these conditions, a more complete measured field is obtained by adding the established mathematical-projection formulas to the field information.

A measured field DH therefore contains:
any variable characteristics that have been chosen;
for different reference points PR, the mathematical projection H(PRj) of the reference point PRj onto medium SC thus provides a new point H(PRj) associated with the corresponding point PTj by bijection. Thus, in the measured field, there exists a series of pairs of points associated by bijection, wherein one point in each pair is the mathematical projection of the other point of the pair.
Thus the measured field DH may also be composed of:
chosen variable characteristics;
pairs that are each composed of a point PT of the reference surface and a point H(PR) representing the mathematical projection of the point PR associated by bijection with the point PT of medium SC.

The measured field DH obtained in this way for an image may include, as a factor, the variable characteristics for the set of pairs of points obtained, in such a way as to achieve a gain of memory space.

According to another alternative embodiment of the invention, the measured field DH may be composed of:
chosen variable characteristics;
pairs of points PT and of mathematical projections of points PR (associated by bijection with the points PT) on medium SC;
and pairs of points PR and of mathematical projections of points PT (associated by bijection with the points PR) on reference surface SR.

As in the foregoing, it is possible with the measured field DH to obtain measured formatted information.

By means of the foregoing examples of methods and systems illustrated by FIGS. 13a to 14b, it is possible to obtain a field of measurements defined as measured field DH, which is composed of as many information sets as there exist chosen points of image I and of virtual reference R.

With this measured field for image I, there is composed a set of measured formatted information IFM. An item of measured formatted information of a point PTj will therefore include, for example:
the fixed characteristics of the appliance or appliances being used;
the chosen variable characteristics;
the X, Y position of point PTj in the image;
the mathematical projection of the corresponding point PRj by bijection.

It will be noted that identity is a particular mathematical projection that can be used, for example in scanners.

The use of the system will lead to the need to process a large number of points and thus a large volume of information. To make operation of the system more flexible, to accelerate processing and/or to be resistant to measurement errors, the method and system illustrated by FIGS. 15a and 15b provide for deducing, from items of measured formatted information IFE1 to IFMn, items of extended formatted information IFE1 to IFEm belonging to a surface that can be represented by a function chosen within a space of limited dimension, such as a polynomial of limited order chosen among the class of polynomials of finite degree, or a spline function of appropriate degree.

FIGS. 15a and 15b illustrate simplified examples corresponding to cases in which the measured formatted information is a function of only a single variable. The invention is applicable in the same way when the formatted information is a function of a plurality of variables, as is generally the case.

FIGS. 15a and 15b illustrate simplified examples corresponding to cases in which the measured formatted information is scalar and is a function of only two variables (X, Y). The invention is applicable in the same way when the formatted information is vectorial and is a function of more than two variables, as is generally the case.

In FIG. 15b, the different coordinates of the points of an image are illustrated in plane IM. The measured formatted information IFE1 is located at the point with coordinates X1, Y1. At each point of plane IM, there is therefore an item of formatted information having a particular value. The invention comprises calculating a parameterizable model such as a polynomial surface SP. A particular way of calculating SP may be to calculate this surface by passing through or by passing in proximity to all of the extremities of the measured formatted information. Another procedure could be to preserve the geometric characteristics (not necessarily Euclidian) of a subset of points of M, such as the alignment of points on a straight line, or any curve of specified parameterization. Under these conditions, the system will be able to use a parameterizable model during processing of an image, instead of resorting to a large volume of measured formatted information.

The difficulty lies in finding a surface SP that passes through all of the points or in proximity to all of these points. The assumption is provided that a deviation EC could exist between an item of measured formatted information IFM and an item of extended formatted information IFE. In addition, it is decided that such an EC must not exceed a certain threshold dS. Under these conditions it will be appropriate to make a polynomial surface pass through all of the points of the measured formatted information IFM±dS.

The choice of this threshold will be made appropriately with the filming errors, the measurement errors, the level of precision required for the correction, etc.

The method and the system employed will be able to provide for the use of a specified number of parameterizable models that can be written, for example, in the form of polynomials. It is provided that these models are classified in order of increasing complexity.

Thereafter, given possession of a set of measured information, each model is tested by starting preferably from the simplest model (the polynomial of lowest order), until there is obtained a model that defines, at the intersection of the polynomial surface and the direction of each item of measured formatted information, an item of extended formatted information whose deviation EC compared with the item of measured formatted information is below the threshold dS.

The method and system illustrated schematically by FIGS. 15a and 15b are designed to obtain extended measured formatted information. However, the invention could be limited to using only the measured formatted information as formatted information. It is also possible to provide for the use, as formatted information, of the measured formatted information and the extended measured formatted information.

Regardless of the case, it is also possible to provide for associating, with the formatted information, the deviations EC found between measured formatted information and extended formatted information. In this way the formatted information can be used by image-processing software to obtain images whose residual geometric distortion is known, whether it be for images captured by an image-capture appliance or for images restituted by an image-restitution appliance.

Referring to FIGS. 16a and 16b, a description will now be given of an alternative version of calculation of the measured field D(H) of an image I.

According to the organizational diagram of algorithm AC2 of FIG. 16a, in which a universal set M such as that of FIG. 14a is available, the capture of this universal set M by means of appliance APP3 is undertaken in the course of a first stage ET2.1. Image I is obtained on medium SC. Also available is a virtual reference R on a reference surface SR. This virtual reference R in principle represents universal set M, exactly or quasi-exactly.

In the course of stage ET2.2, a bijection is established between the characteristic image points PT of image I of medium SC and the reference points PR of virtual reference R of reference surface SR (see also FIG. 14a).

In the course of stage ET2.3, there is chosen a mathematical projection such as a bilinear transformation between different points of medium SC (or of image I) and different points of reference surface SR (or of virtual reference R).

In the course of stage ET2.4, a vector characterizing the geometric distortion defect is calculated for each characteristic image point PT or for each reference point PR. FIG. 16*b* illustrates this stage of the method by an example of practical implementation. This figure shows different values of reference points PR distributed over reference surface SR. With each point PR there is associated the mathematical projection H(PT) of the point PT associated by bijection with PR. The vector VM having origin PR and extremity H(PT) is calculated for each point.

In the course of stage ET2.5, the measured field is calculated.

This field DH, which can also be defined as a field of measured vectors, is composed of:

pairs of chosen points PT and PR associated by bijection; the vector calculated for each point.

The field DH may also be composed more simply of:

reference point PR of SR and/or characteristic image point PT of SC and/or of the mathematical projection of reference point PR onto SC (or conversely of the projection of characteristic image point PT onto SR), and of the vector calculated in the foregoing and associated with that point.

The measured field DH may also include variable characteristics of appliance APP1 (APP2).

The field DH may also be composed of an approximation of measured information. In fact, to obtain a gain of calculation space and/or time, the measured formatted information can be quantified by means of a limited number of bits (3 bits, for example).

It will be noted that, during stage ET2.4, the calculated vector VM can be that having as origin the mathematical projection H(PT) of the point PT onto surface SR and as extremity the point PR.

Alternatively, the vector VM may be that having as origin the characteristic point PT and as extremity the mathematical projection of the point PR associated by bijection. Conversely, the vector VM may be that having as origin the mathematical projection of a point PR associated by bijection with a point PT and, as extremity, this point PT or another combination that employs the said points.

In the foregoing, it has been seen that formatted information could contain variable characteristics. In fact, a combination of variable characteristics, such as a combination of focal length, focusing, diaphragm aperture, capture speed, aperture, etc. may be involved. It is difficult to imagine how the formatted information related to different combinations can be calculated, all the more so because certain characteristics of the combination, especially such as the focal length and the distance, can vary continuously.

As illustrated in FIG. 17, the invention provides for calculating the formatted information by interpolation from measured formatted information for combinations of known variable characteristics.

For example, in the simplified illustration of FIG. 17, each plane contains the measured formatted information of an image for a specified value of combinations. For example, the plane f=2 corresponds to the combination of "focal length=2, distance=7, capture speed=1/100". The plane f=10 corresponds to the combination of "focal length=10, distance=7, capture speed=1/100". The plane f=50 corresponds to the combination of "focal length=50, distance=7, capture speed=1/100".

For an arbitrary point PQT of the medium or an arbitrary point PQR of the reference surface, whose variable characteristics contain among others the combination of "focal length=25, distance=7 and capture speed=1/100", a value of extended formatted information is interpolated between the two planes f=10 and f=50 of FIG. 17 and, in particular, assuming that the planes of FIG. 17 represent measured formatted information of points PT of the image, between the two points PT(10) and PT(50) of planes f=10 and f=50.

A practical example of the invention will therefore employ the calculation of a measured field, such as that described in connection with FIGS. 13 or 14, then the calculation of formatted information, as described in connection with FIGS. 15*a* to 16*b*. These different calculations and the corresponding stages will be undertaken for different combinations of variable characteristics and/or for different combinations with an associated value. Then, for an arbitrary point (PQT or PQR) or a set of arbitrary points of an image I captured by means of an arbitrary but known combination, extended formatted information will be interpolated between two planes of measured formatted information.

In FIG. 17 there is considered a case in which the point for which formatted information is to be calculated had the same coordinates X and Y as the points for which the measured formatted information is known.

FIG. 18 illustrates the case of a search for the measured formatted information of an arbitrary point PQRi or PQTi, which is situated between the planes f=10 and f=50 and whose coordinates do not correspond to coordinates of points of the planes f=10 and f=50.

To each point there is assigned an argument Ai containing at least the coordinates Xi and Yi of the point as well as the characteristics of a combination of variable characteristics.

The plane f=2 corresponds to a combination C1.0 of variable characteristics. The plane f=10 corresponds to a combination C2.0 and the plane f=50 corresponds to a combination Cm.0.

Each point of the plane f=2 has as argument:

"coordinates X, Y; combination C1.0".

The point PQRi or PQTi for which formatted information is being sought has as argument:

"coordinates Xi, Yi; combination Ci".

Under these conditions, the method and system will perform, for example, an interpolation between the items of measured formatted information of planes f=10 and f=50.

For an arbitrary point PQT/PQR, it is sufficient, for example, to reinject the argument (X, Y, focal length, distance, aperture, iso, speed, flash, etc.) related to this point into the parameterizable model in order to find the formatted information related to this point.

An effective way of calculating the bilinear transformation between reference surface SR and medium surface SC may be achieved by choosing, on medium SC and on reference surface SR, four points PTm4 to PTm4 and PRm1 to PRm4 that correspond by bijection and that, for example, are at the peripheral limits of medium SC and of reference surface SR. The positions of these points are chosen, for example, in such a way as to maximize the areas included between these points.

In addition, as illustrated in FIG. 19*c*, the positions of these points are such that the intersection of the diagonals of the quadrilaterals defined by these points is located at the center or close to the center of the quadrilaterals.

There is then calculated a mathematical projection (such as a bilinear transformation) with which the four characteristic points PTm.1 to PTm.4 can be transformed to the four reference points PRm.1 to PRm.4.

This mathematical projection will be associated with the formatted information of the image.

It will be possible to use this formatted information in image-processing software to correct the geometric distortions of perspective or to restitute images with little change of perspective.

Another way of choosing the four points PTm.1 to 4 and PRm1. to 4 comprises taking, within image I, four points PTm.1 to 4 in such a way that they form a quadrilateral that is as close as possible, except for a scaling factor, to the quadrilateral formed by the points H(PRm.1 to 4), which are mathematical projections of the points PRm.1 to 4 corresponding via bijections to the points PTm.1 to 4.

Referring to FIGS. 20a to 20d, a description will be given of methods for calculating formatted information related to color images. A color image can be regarded as being composed of a plurality of monochromatic images. Traditionally, it can be considered that a color image is a trichromatic image composed of three monochromatic images (red, green, blue). It is known in optics that the distortions induced by the optical systems and the light-transmission media induce different effects on the different wavelengths. In a trichromatic image, the same physical defect of an appliance will therefore induce different distortions on the image being transported by light of red wavelength, on that being transported by light of green wavelength and on that being transported by light of blue wavelength.

As illustrated in FIG. 20a, starting from a trichromatic universal set M, to which there corresponds a quasi-identical virtual reference R, there will correspond, in image I, three superposed images R, G and B, which have been illustrated separately on the planes SCR, SCG and SCB. The three images IR, IG and IB exhibit different distortions, leading to a trichromatic image that exhibits both geometric distortions and chromatic aberrations.

FIG. 20b illustrates the principle of the method and system with which there can be obtained formatted information that will permit image-processing software to correct distortions and/or chromatic aberrations.

According to this method and system, one item of formatted information per color will be calculated for each trichromatic point of the image. It will therefore be considered that it is appropriate to correct as many monochromatic images as there are colors. In the trichromatic example, the calculations will be performed as if there were three images to be corrected.

For calculation of the formatted information of the three images IR, IG and IB, there are used the same methods and systems as those described in relation to FIGS. 13a to 19c.

FIG. 20b illustrates surface SR with a virtual reference R containing trichromatic points PR(RGB) and also illustrates the decomposition of image I into three monochromatic images IR, IG, IB, each containing the points PTR, PTG, PTB of a single color.

One way of calculating the formatted information related to a trichromatic point is to use the same virtual reference R for the three color planes. Thus three mathematical projections are used: a mathematical projection HR for red point PTR, a mathematical projection HG for green point PTG and a mathematical projection HB for blue point PTB, as illustrated in FIG. 20b.

A second approach for calculating the formatted information related to a trichromatic point is to use the choice of a single monochromatic image IR or IG or IB, from which a single mathematical projection HR or HG or HB is calculated. For example, the formatted information is extracted solely from image IR, and this formatted information will be retained for the green and blue images. This approach is economic in terms of calculation time and memory space.

By means of the formatted information obtained in this way, it will then be possible to correct the geometric distortions.

As shown in FIG. 20c, another approach is to use the same virtual reference R and to calculate formatted information for each color plane by using the same mathematical projection, defined optionally, onto one of the monochromatic planes. For example, only the mathematical projection HR related to the red point is calculated. This mathematical projection is then applied to the three red, green and blue points to calculate the formatted information of these three points. In this case, it will be possible for image-processing software to correct both the geometric distortions and the chromatic aberrations of the image.

Another approach, illustrated by FIG. 20d, consists in:

For the image of a specified color, such as the red image IR, calculating the formatted information by using a virtual reference R assumed to be perfect and a mathematical projection H(R) of the points of the virtual reference onto the surface of the red image IR, thus making it possible to correct the distortions of the red image.

For the images of the other colors, such as the green and blue images IG and IB, using the foregoing color image—the red image IR according to the adopted example—as virtual reference R' and undertaking the same mathematical projection H(IRd) of the points of this red image onto the surfaces of the green image IG and then blue image IB. Preferably, this mathematical projection will be an identity (or identity projection) of the points of the red image onto the green and blue images. In this way it will be possible to suppress the differences (chromatic aberrations) between the red, green and blue images. The formatted information of the points of the green and blue images will therefore be able to contain the mathematical projection of the points of virtual reference R onto the red image as well as the mathematical projections (identity) of the red image onto the green and blue images respectively. This approach may make it possible, as the case may be, to correct the distortions alone by using only the formatted information extracted from the red image, the chromatic aberration alone by using only the formatted information related to the green and blue images, or the two phenomena simultaneously by using all of the formatted information.

It will also be noted in the foregoing description that it will be possible to make the choice of thresholds for each parameterizable model related to the chromatic aberrations in a manner different from that related to the geometric distortions, in such a way as to achieve greater or lesser precision in compensating for that defect.

It will also be noted that the choice of mathematical projections may be made for only part of the image. For example, if image I and virtual reference R have shapes such as illustrated in FIG. 22, and if a perspective effect is to be restituted in the image, the mathematical projection of points PR onto medium SC will be possible by using only four points PT1 to PT4 and PR1 to PR4, which are sufficient to define a bilinear transformation. The other points of the image will then follow this mathematical projection for the purpose of obtaining an image exhibiting a perspective effect, such as the image IC1 illustrated in FIG. 22. This choice of mathematical projection may be generalized so as to obtain a particular effect on the image to be corrected by image-processing software by means of formatted information calculated in this way.

It will be noted that, although chromatic information has been used for correction of distortions, it would also be possible to use brightness information.

In the foregoing, it was considered that virtual reference R was quasi-identical to universal set M. If it is considered that virtual reference R is exactly identical to universal set M, it will be possible to calculate formatted information that will make it possible to correct image I so that it is the exact replica of universal set M.

As illustrated in FIG. 21, it may be provided that virtual reference R is deformed compared with universal set M. For example, the virtual reference has a trapezoidal shape, whereas universal set M has a rectangular shape. The formatted information that will be obtained will make it possible to correct image I to induce a trapezoidal deformation on the corrected image. An example of application of such an arrangement exists in overhead projectors, where it will be possible to correct the well-known deformation induced by these appliances during projection because of the fact that the axis of the projection beam is not perpendicular to the plane of the screen.

It is also possible to deform the virtual reference by distortions, to induce characteristics and even defects obtained with appliances other than those obtained by the appliances with which construction of image I was possible. As an example, it will be possible to induce, in the virtual reference, characteristics of improved appliances or alternatively of old appliances, to impart a particular appearance to the corrected image. The formatted information, the measured formatted information or the extended measured formatted information obtained with such a virtual reference integrate the distortions that were induced in the virtual reference, in such a way that the formatted information and/or the measured formatted information can be used by software for processing images captured by a first image-capture appliance to obtain images whose quality, in terms of distortions, is comparable to that of a second image-capture appliance. This technique is also applicable to image restitution, by considering that image-processing software can then restitute, by means of a first restitution appliance, an image whose quality, in terms of distortions, is comparable to that provided by a second restitution appliance.

In addition, it may be provided that the formatted information obtained, when used by image-processing software, will lead to the presence of unprocessed zones on the periphery of the corrected image. As an example, an uncorrected image I illustrated in FIG. 23c will be able to yield a corrected image Ic such as illustrated in FIG. 23b, and which possesses unprocessed zones ZN, which are represented in black in FIG. 23b.

It will therefore be possible to modify the formatted information beforehand, to obtain an enlargement effect Ic' such as illustrated in FIG. 23c, in such a way as to eliminate the unprocessed zones.

For practical purposes during calibration and during calculation of formatted information, it will advantageously be provided that the calculations will be performed and the methods described will be applied to a plurality of images, and then an average of the results obtained will be taken, thus eliminating beforehand, if need be, the results that seem aberrant.

In addition, in the case of combinations involving variable characteristics that can have a large number of values, it is possible to provide for limiting the number of combinations. For this purpose, it is provided that an analysis into principal components will be undertaken for these variable characteristics. It involves searching for a particular direction or directions of the components corresponding to these variable characteristics for which the distortions are substantial. For other directions, regardless of what the other variable characteristics are, it will probably be observed that little or no variation of distortion exists. Thus these other directions will not be taken into account.

In the preferential direction or directions, the number of reference images will be chosen according to different criteria, such as the fact of being able to predict, with the desired precision, the (n+1)-th combination as a function of the first n combinations.

In the foregoing description, it was considered that the image is composed of points and that the processing operations of the described methods and systems are applied to points. Without departing from the scope of the invention, however, the described methods and systems could process sets of points forming elements and representing patterns (lozenges, etc.).

In the case in which the appliance or the appliance chain possesses a variable characteristic that may have only a reduced number of discrete values (three discrete values of focal length, for example), it will be of interest, in terms of precision, to employ, according to the adopted example, the process with fixed focal length three times rather than to use an approximating polynomial surface that would include the focal length as parameter.

The field of application of the device can cover the field of application related to image quality, its being understood that the quality of images can be measured in terms, among other factors, of the residual distortion that they contain. The invention is also applicable to the art of measurement based on vision by computer, known by the expression "vision metrology".

Furthermore, the invention can be used to calculate the value of the focal length that was used to capture an image. In fact, starting from an image that is free of radial distortions because it has been corrected, a person skilled in the art can use the geometric properties of vanishing points as described in the article of G.-Q. WEI et al. entitled "Camera Calibration by Vanishing Point and Cross Ratio", published in IEEE International Conference on Acoustics Speech and Signal Processing, pages 1630-1633, Glasgow, Great Britain, May 1989. That will make it possible to obtain the focal distance of the image-capture or image-restitution device as well as the position, on image medium SC, of the intersection of the optical axis with this medium. This information can be used, for example, in applications such as vision metrology.

Furthermore, it will be noted that, with the exception of a bilinear transformation, the knowledge of the universal set M is defined, and that the image-capture and/or image-restitution device does not require any constraint of orthogonality at the filming moment. The positions of the points PT are not necessarily placed on regular shapes (line or circle), and may certainly have a random distribution. Furthermore, their relative position may be known with the mere exception of a scaling factor.

If the invention is employed in the case of an appliance chain containing a plurality of appliances, such as a projector and a photo appliance, or such as a printer and a scanner, and if one of the appliances, for example the photo appliance or the scanner, exhibits zero or little distortion defect, the method and system produce formatted information related solely to the other appliance. This is the case of a practical method for producing formatted information related to an image-restitution appliance by using an image-capture appliance which is free of defects or whose defects have been measured and corrected beforehand.

If the invention is employed in the case of an appliance chain containing a plurality of appliances, such as a photo appliance and a scanner, the method and system produce formatted information related to both appliances. This is the case of a practical method for permitting the correction of defects of a photo appliance without having to know the defects of the scanner, in the case in which the images used by the present method and system and by the image-processing means were scanned with the same appliance.

Alternative Embodiment

Other characteristics and advantages of the invention will become apparent on reading:
of the definitions explained hereinafter of the employed technical terms, referring to the indicative and non-limitative examples of FIGS. 1 to 12,
of the description of FIGS. 1 to 12.

Scene

Scene 3 is defined as a place in three-dimensional space, containing objects 107 illuminated by light sources.

Image-capture Appliance, Amage, Image Capture

Referring to FIGS. 3 and 7, a description will now be given of what is understood by image-capture appliance 1 and image 103. Image-capture appliance 1 is defined as an appliance composed of an optical system 100, of one or more sensors 101, of an electronic unit 102 and of a memory zone 16. By means of the said image-capture appliance 1, it is possible to obtain, from a scene 3, fixed or animated digital images 103 recorded in memory zone 16 or transmitted to an external device. Animated images are composed of a succession of fixed images 103 in time. The said image-capture appliance 1 can have the form in particular of a photographic appliance, of a video camera, of a camera connected to or integrated in a PC, of a camera connected to or integrated in a personal digital assistant, of a camera connected to or integrated in a telephone, of a videoconferencing appliance or of a measuring camera or appliance sensitive to wavelengths other than those of visible light, such as a thermal camera.

Image capture is defined as the method by which image 103 is calculated by image-capture appliance 1.

In the case in which an appliance is equipped with a plurality of interchangeable subassemblies, especially an optical system 100, image-capture appliance 1 is defined as a special configuration of the appliance.

Image-restitution Means, Restituted Image, Image Restitution

Referring to FIG. 2, a description will now be given of what is understood by image-restitution means 19. Such an image-restitution means 19 can have the form in particular of a visual display screen, of a television screen, of a flat screen, of a projector, of virtual reality goggles, of a printer.

Such an image-restitution means 19 is composed of:
an electronic unit,
one or more sources of light, of electrons or of ink,
one or more modulators: devices for modulation of light, of electrons or of ink,
a focusing device, having in particular the form of an optical system in the case of a light projector or the form of electron-beam focusing coils in the case of a CRT screen, or the form of filters in the case of a flat screen,
a restitution medium 190 having in particular the form of a screen in the case of a CRT screen, of a flat screen or of a projector, the form of a print medium on which printing is performed in the case of a printer, or the form of a virtual surface in space in the case of a virtual-image projector.

By means of the said image-restitution means 19, it is possible to obtain, from an image 103, a restituted image 191 on restitution medium 190.

Animated images are composed of a succession of fixed images in time.

Image restitution is defined as the method by which the image is displayed or printed by means of image restitution means 19.

In the case in which a restitution means 19 is equipped with a plurality of interchangeable subassemblies or of subassemblies that can be shifted relative to one another, especially restitution medium 190, image-restitution means 19 is defined as a special configuration.

Sensor Surface, Optical Center, Focal Distance

Referring to FIG. 1, a description will now be given of what is defined as sensor surface 110.

Sensor surface 110 is defined as the shape in space drawn by the sensitive surface of sensor 101 of image-capture appliance 1 at the moment of image capture. This surface is generally plane.

An optical center 111 is defined as a point in space associated with image 103 at the moment of image capture. A focal distance is defined as the distance between this point 111 and plane 110, in the case in which sensor surface 110 is plane.

Pixel, Pixel Value, Exposure Time

Referring to FIG. 3, a description will now be given of what is understood by pixel 104 and pixel value.

A pixel 104 is defined as an elemental zone of sensor surface 110 obtained by creating a grid, generally regular, of the said sensor surface 110. Pixel value is defined as a number associated with this pixel 104.

Image capture is defined as determining the value of each pixel 104. The set of these values constitutes image 103.

During image capture, the pixel value is obtained by integration, over the surface of pixel 104, during a time period defined as exposure time, of part of the light flux derived from scene 3 via optical system 100, and by converting the result of this integration to a digital value. The integration of the light flux and/or the conversion of the result of this integration to a digital value are performed by means of electronic unit 102.

This definition of the concept of pixel value is applicable to the case of black-and-white or color images 103, whether they be fixed or animated.

Depending on the cases, however, the part in question of the light flux is obtained in various ways:

a) In the case of a color image 103, sensor surface 110 is generally composed of a plurality of types of pixels 104, associated respectively with light fluxes of different wavelengths, examples being red, green and blue pixels.

b) In the case of a color image 103, there may also be a plurality of sensors 101 disposed side-by-side, each receiving part of the light flux.

c) In the case of a color image 103, the colors used may be different from red, green and blue, such as for North American NTSC television, and they may exceed three in number.

d) Finally, in the case of an interlaced television scanning camera, the animated images produced are composed of an alternation of images 103 containing even-numbered lines and of images 103 containing odd-numbered lines.

Configuration Used, Adjustments Used, Characteristics Used

The configuration used is defined as the list of removable subassemblies of image-capture appliance 1, such as optical system 100 which, if it is interchangeable, is mounted on image-capture appliance 1. The configuration used is characterized in particular by:

the type of optical system 100,
the serial number of optical system 100 or any other designation.

Adjustments used are defined as:
the configuration used as defined hereinabove, as well as
the value of the manual or automatic adjustments available in the configuration used and having an impact on the content of image 103. These adjustments may be made by the user, especially by means of pushbuttons, or may be calculated by image-capture appliance 1. These adjustments may be stored in the appliance, especially on a removable medium, or on any device connected to the appliance. These adjustments may include in particular the adjustments of focusing, diaphragm and focal length of optical system 100, the adjustments of exposure time, the adjustments of white balance, and the integrated image-processing adjustments, such as digital zoom, compression and contrast.

Characteristics 74 used or set of characteristics 74 used are defined as:

a) Parameters related to the intrinsic technical characteristics of image-capture appliance 1, determined during the phase of design of image-capture appliance 1. For example, these parameters may include the formula of optical system 100 of the configuration used, which impacts the geometric defects and the sharpness of the captured images; the formula of optical system 100 of the configuration used includes in particular the shape, the arrangement and the material of the lenses of optical system 100.

These parameters may additionally include:
the geometry of sensor 101, or in other words sensor surface 110 as well as the shape and relative arrangement of pixels 104 on this surface,
the noise generated by electronic unit 102,
the equation for conversion of light flux to pixel value.

b) Parameters associated with the intrinsic technical characteristics of image-capture appliance 1, determined during the phase of manufacture of image-capture appliance 1 and, in particular:

the exact positioning of the lenses in optical system 100 of the configuration used,
the exact positioning of optical system 100 relative to sensor 101.

c) Parameters associated with the technical characteristics of image-capture appliance 1, determined at the moment of capture of image 103 and, in particular:

the position and orientation of sensor surface 110 relative to scene 3,
the adjustments used,
the external factors, such as temperature, if they have an influence.

d) The user's preferences, especially the color temperature to be used for image restitution. For example, these preferences are selected by the user by means of pushbuttons.

The characteristics 74 used include in particular the concept of variable characteristics.

Observation Point, Observation Direction

Referring to FIG. 1, a description will now be given of what is understood by observation point 105 and observation direction 106.

Mathematical surface 10 is defined as a surface that is geometrically associated with sensor surface 110. For example, if the sensor surface is plane, it will be possible for mathematical surface 10 to coincide with the sensor surface.

Observation direction 106 is defined as a line passing through at least one point of scene 3 and through optical center 111. Observation point 105 is defined as the intersection of observation direction 106 and surface 10.

Observed Color, Observed Intensity

Referring to FIG. 1, a description will now be given of what is understood by observed color and observed intensity. Observed color is defined as the color of the light emitted, transmitted or reflected by the said scene 3 in the said observation direction 106 at a given instant, and observed from the said observation point 105. Observed intensity is defined as the intensity of the light emitted by the said scene 3 in the said observation direction 106 at the same instant, and observed from the said observation point 105.

The color can be characterized in particular by a light intensity that is a function of wavelength, or else by two values as measured by a calorimeter. The intensity can be characterized by a value such as measured with a photometer.

The said observed color and the said observed intensity depend in particular on the relative position of objects 107 in scene 3 and on the illumination sources present as well as on the transparency and reflection characteristics of objects 107 at the moment of observation.

Mathematical Projection, Mathematical Image, Mathematical Point, Mathematical Color of a Point, Mathematical Intensity of a Point, Mathematical Shape of a Point, Mathematical Position of a Point Generally speaking, a mathematical transformation such as a mathematical projection is an operation making it possible to establish a correspondence between a first image and a second image and more precisely between a point of a first and a point of a second image.

In FIGS. 1 to 9d, and in particular FIG. 5, a mathematical projection 8 has the purpose of constructing, from a real image or from a scene 3, a mathematical image 70 or, from a reference scene 9, a synthetic image.

In FIGS. 13a to 23c, and in particular FIG. 14a, a mathematical projection H has the purpose of establishing a relationship between a real image (image 1 on FIG. 14a) and a virtual reference (R on FIG. 14a), so as to establish the differences between the image and the virtual reference, so as to have information for correcting the real image.

Referring for example to FIGS. 1, 5, 9a, 9b, 9c and 9d, a description in greater detail will be given of the concepts of mathematical projection 8, mathematical image 70, mathematical point, mathematical color of a point, mathematical intensity of a point, mathematical shape 41 of a point, and mathematical position 40 of a point.

Referring to FIG. 5, a description first of all will be given of how a mathematical image 70 is constructed by specified mathematical projection 8 of at least one scene 3 on mathematical surface 10.

Firstly, a description will be given of what is understood by specified mathematical projection 8.

A specified mathematical projection 8 associates a mathematical image 70 with:
- a scene 3 at the moment of capture of an image,
- and with the characteristics 74 used.

A specified mathematical projection 8 is a transformation with which the characteristics of each point of mathematical image 70 can be determined from scene 3 at the moment of image capture and from the characteristics 74 used.

Mathematical projection 8 is preferentially defined in the manner to be described hereinafter.

Mathematical position 40 of the point is defined as the position of observation point 105 on mathematical surface 10.

Mathematical shape 41 of the point is defined as the geometric, punctiform shape of observation point 105.

Mathematical color of the point is defined as the observed color.

Mathematical intensity of the point is defined as the observed intensity.

Mathematical point is defined as the association of mathematical position 40, mathematical shape 41, mathematical color and mathematical intensity for the observation point 105 under consideration. Mathematical image 70 is composed of the set of said mathematical points.

The mathematical projection 8 of scene 3 is mathematical image 70.

Real Projection, Real Point, Real Color of a Point, Real Intensity of a Point, Real Shape of a Point, Real Position of a Point Referring in particular to FIGS. 3, 5, 9a, 9b, 9c and 9d, a description will be given hereinafter of the concepts of real projection 72, real point, real color of a point, real intensity of a point, real shape 51 of a point, and real position 50 of a point.

During image capture, image-capture appliance 1 associated with the characteristics 74 used, produces an image. In this way, on FIGS. 1 and 7, there is obtained an image 103 of scene 3 and on FIGS. 13a and 14a, there is obtained an image I of universal set M. On FIG. 1, the light originating from scene 3 in an observation direction 106 passes through optical system 100 and arrives at sensor surface 110.

For the said observation direction, there is then obtained what is defined as a real point (or characteristic point PT on FIG. 3a), which exhibits differences compared with the mathematical point (or reference point PR on FIG. 32).

Referring to FIGS. 9a to 9d, a description will now be given of the differences between the real point and the mathematical point.

The real shape 51 associated with the said observation direction 106 is not a point on the sensor surface, but it has the form of a cloud in three-dimensional space, where it has an intersection with one or more pixels 104. These differences are due in particular to coma, spherical aberration, astigmatism, grouping into pixels 104, chromatic aberration, depth of field, diffraction, parasitic reflections and field curvature of image-capture appliance 1. They give an impression of blurring, or of lack of sharpness of image 103.

In addition, real position 50 associated with the said observation direction 106 exhibits a difference compared with mathematical position 40 of a point. This difference is due in particular to the geometric distortion, which gives an impression of deformation: for example, vertical walls appear to be curved. It is also due to the fact that the number of pixels 104 is limited, and that consequently the real position 50 can have only a finite number of values.

In addition, the real intensity associated with the said observation direction 106 exhibits differences compared with the mathematical intensity of a point. These differences are due in particular to gamma and vignetting: for example, the edges of image 103 appear to be darker. Furthermore, noise may be added to the signal.

Finally, the real color associated with the said observation direction 106 exhibits differences compared with the mathematical color of a point. These differences are due in particular to gamma and the color cast. Furthermore, noise may be added to the signal.

A real point is defined as the association of the real position 50, the real shape 51, the real color and the real intensity for the observation direction 106 under consideration.

The real projection 72 of scene 3 is composed of the set of real points.

Parameterizable Transformation Model, Parameters, Corrected Image

In an alternative embodiment, a parameterizable transformation model 12 (or parameterizable transformation 12 for short) is defined as a mathematical transformation in which a corrected image 71 can be obtained from an image 103 and from the value of parameters. As indicated hereinbelow, the said parameters can in particular be calculated from the characteristics 74 used.

By means of the said parameterizable transformation 12, it is possible in particular to determine, for each real point of image 103, the corrected position of the said real point, the corrected color of the said real point, the corrected intensity of the said real point, and the corrected shape of the said real point, from the value of the parameters, from the real position of the said real point and from the values of the pixels of image 103. As an example, the corrected position can be calculated by means of polynomials of fixed degree as a function of the real position, the coefficients of the polynomials depending on the value of the parameters. The corrected color and the corrected intensity can be, for example, weighted sums of the values of the pixels, the coefficients depending on the value of the parameters and on the real position, or else can be nonlinear functions of the values of the pixels of image 103.

The parameters can include in particular: the focal length of optical system 100 of the configuration used, or a related value such as the position of a group of lenses, the focusing of optical system 100 of the configuration used, or a related value such as the position of a group of lenses, the aperture of optical system 100 of the configuration used, or a related value such as the position of the diaphragm.

Difference Between the Mathematical Image and the Corrected Image

Referring to FIG. 5, the difference 73 between mathematical image 70 and corrected image 71 for a given scene 3 and given characteristics 74 used is defined as one or more values determined from numbers characterizing the position, color, intensity, and shape of all or part of the corrected points and of all or part of the mathematical points.

For example, the difference 73 between mathematical image 70 and corrected image 71 for a given scene 3 and given characteristics 74 used can be determined as follows:
There are chosen characteristic points which, for example, may be the points of an orthogonal array 80 of regularly disposed points, as illustrated in FIG. 10.

The difference 73 is calculated, for example, by taking, for each characteristic point, the sum of the absolute values of the differences between each number characterizing position, color, intensity and shape respectively for the corrected point and for the mathematical point. The sum function of the absolute values of the differences may be replaced by another function such as the mean, the sum of the squares or any other function with which the numbers can be combined.

Reference Scene or Universal Set

A reference scene 9 (or universal set M on FIG. 13a and following) is defined as a scene 3 for which certain characteristics are known. As an example, FIG. 4a shows a reference scene 9 composed of a paper sheet bearing regularly disposed, solid black circles. FIG. 4b shows another paper sheet bearing the same circles, with the addition of colored lines and areas. The circles are used to measure the real position 50 of a point, the lines to measure the real shape 51 of a point, and the colored areas to measure the real color of a point and the real intensity of a point. This reference scene 9 may be composed of a material other than paper.

Reference Image

Referring to FIG. 12, a definition will now be given of the concept of reference image 11 (or image I on the medium SC of FIG. 13a and following). A reference image 11 is defined as an image of reference scene 9 obtained with image-capture appliance 1.

Synthetic Image, Synthetic-image Class

Referring to FIG. 12, a definition will now be given of the concept of synthetic image and of synthetic-image class 7. A synthetic image is defined as a mathematical image 70 obtained by mathematical projection 8 of a reference scene 9. A synthetic-image class 7 is defined as a set of mathematical images 70 obtained by mathematical projection 8 of one or more reference scenes 9 for one or more sets of characteristics 74 used. In the case in which there is only one reference scene 9 and only one set of characteristics 74 used, the synthetic-image class 7 comprises only one synthetic image. On FIGS. 13a and following, the virtual reference R of the virtual surface SR can be considered as being such a synthetic image.

Transformed Image

Referring to FIG. 12, a definition will now be given of the concept of transformed image 13. A transformed image 13 is defined as the corrected image obtained by application of a parameterizable transformation model 12 to a reference image 11.

Transformed Image Close to a Synthetic-image Class, Residual Deviation

Referring to FIG. 12, a description will now be given of the concept of transformed image 13 close to a synthetic-image class 7 and of the concept of residual deviation 14.

The difference between a transformed image 13 and a synthetic-image class 7 is defined as the smallest difference between the said transformed image 13 and any one of the synthetic images of the said synthetic-image class.

Referring to FIG. 12, a description will next be given of a fourth algorithm with which it is possible to choose, among the parameterizable transformation models 12, that with which each reference image 11 can be transformed to a transformed image 13 close to the synthetic-image class 7 of the reference scene 9 corresponding to the said reference image 11, in different cases of reference scenes 9 and characteristics 74 used.

In the case of a given reference scene 9 associated with a set of given characteristics 74 used, there is chosen the parameterizable transformation 12 (and its parameters) with which the reference image 11 can be transformed to the transformed image 13 that exhibits the smallest difference compared with synthetic-image class 7. Synthetic-image class 7 and transformed image 13 are then said to be close. Residual deviation 14 is defined as the said difference.

In the case of a group of given reference scenes associated with sets of given characteristics 74 used, the parameterizable transformation 12 (and its parameters) is chosen as a function of the differences between the transformed image 13 of each reference scene 9 and the synthetic-image class 7 of each reference scene 9 under consideration. There is chosen the parameterizable transformation 12 (and its parameters) with which the reference images 11 can be transformed to transformed images 13 such that the sum of the said differences is minimized. The sum function may be replaced by another function such as the product. Synthetic-image class 7 and transformed images 13 are then said to be close. Residual deviation 14 is defined as a value obtained from the said differences, for example by calculating the mean thereof.

In the case in which certain characteristics 74 used are unknown, it is possible to determine them from the capture of a plurality of reference images 11 of at least one reference scene 9. In this case, there are simultaneously determined the unknown characteristics and the parameterizable transformation 12 (and its parameters) with which the reference images 11 can be transformed to transformed images 13, such that the sum of the said differences is minimized, in particular by iterative calculation or by solving equations concerning the sum of the said differences and/or their product and/or any other appropriate combination of the said differences. Synthetic-image class 7 and transformed images 13 are then said to be close. The unknown characteristics may be, for example, the relative positions and orientations of sensor surface 110 and of each reference scene 9 under consideration. Residual deviation 14 is defined as a value obtained from the said differences, for example by calculating the mean thereof.

Best Transformation

The best transformation is defined as the transformation with which, among the parameterizable transformation models 12, each reference image 11 can be transformed to a transformed image 13 close to synthetic-image class 7 of the reference scene 9 corresponding to the said reference image 11.

Calibration

Calibration is defined as a method with which data related to the intrinsic characteristics of image-capture appliance 1 can be obtained, for one or more configurations used, each composed of an optical system 100 associated with an image-capture appliance 1.

Case 1: in the case in which there is only one configuration, the said method includes the following stages:

the stage of mounting the said optical system 100 on the said image-capture appliance 1, the stage of choosing one or more reference scenes 9, the stage of choosing several characteristics 74 used, the stage of capturing images of the said reference scenes 9 for the said characteristics used, the stage of calculating the best transformation for each group of reference scenes 9 corresponding to the same characteristics 74 used.

Case 2: in the case in which all the configurations corresponding to a given image-capture appliance 1 and to all optical systems 100 of the same type are taken into consideration, the said method includes the following stages:

the stage of choosing one or more reference scenes 9, the stage of choosing several characteristics 74 used, the stage of calculating images 103 from characteristics 74 used and in particular from formulas for optical system 100 of the configuration used and from values of parameters, by means, for example, of software for calculating the optical system by ray tracing, the stage of calculating the best transformation for each group of reference scenes 9 corresponding to the same characteristics used.

Case 3: in the case in which all the configurations corresponding to a given optical system 100 and to all the image-capture appliances 1 of the same type are taken into consideration, the said method includes the following stages:

the stage of mounting the said optical system 100 on an image-capture appliance 1 of the type under consideration, the stage of choosing one or more reference scenes 9, the stage of choosing several characteristics 74 used, the stage of capturing images of the said reference scenes 9 for the said characteristics used, the stage of calculating the best transformation for each group of reference scenes 9 corresponding to the same characteristics used.

Calibration can be performed preferentially by the manufacturer of image-capture appliance 1, for each appliance and configuration in case 1. This method is more precise but imposes more limitations and is highly suitable in the case in which optical system 100 is not interchangeable.

Alternatively, calibration can be performed by the manufacturer of image-capture appliance 1, for each appliance type and configuration in case 2. This method is less precise but is simpler.

Alternatively, calibration can be performed by the manufacturer of image-capture appliance 1 for each optical system 100 and type of appliance in case 3. This method is a compromise in which one optical system 100 can be used on all image-capture appliances 1 of one type, without repeating the calibration for each combination of image-capture appliance 1 and optical system 100.

Alternatively, calibration can be performed by the appliance seller or installer, for each image-capture appliance 1 and configuration in case 1.

Alternatively, calibration can be performed by the appliance seller or installer, for each optical system 100 and type of appliance in case 3.

Alternatively, calibration can be performed by the appliance user, for each appliance and configuration in case 1.

Alternatively, calibration can be performed by the appliance user, for each optical system 100 and type of appliance in case 3.

Design of the Digital Optical System

Design of the digital optical system is defined as a method for reducing the cost of optical system 100, by:

designing an optical system 100 having defects, especially in positioning of real points, or choosing the same from a catalog, reducing the number of lenses, and/or simplifying the shape of the lenses, and/or using less expensive materials, processing operations or manufacturing processes.

The said method includes the following stages:

the stage of choosing an acceptable difference (within the meaning defined hereinabove), the stage of choosing one or more reference scenes 9, the stage of choosing several characteristics 74 used.

The said method also includes iteration of the following stages:

the stage of choosing an optical formula that includes in particular the shape, material and arrangement of the lenses, the stage of calculating images 103 from the characteristics 74 used and in particular from the formulas for optical system 100 of the configuration used, by employing, for example, software for calculating the optical system by ray tracing, or by making measurements on a prototype, the stage of calculating the best transformation for each group of reference scenes 9 corresponding to the same characteristics 74 used, the stage of verifying if the difference is acceptable, until the difference is acceptable.

Formatted Information

Formatted information 15 associated with image 103, or formatted information 15, is defined as all or part of the following data:

data related to the intrinsic technical characteristics of image-capture appliance 1, especially the distortion characteristics, and/or data related to the technical characteristics of image-capture appliance 1 at the moment of image capture, especially the exposure time, and/or data related to the preferences of the said user, especially the color temperature, and/or data related to the residual deviations 14.

Database of Characteristics

A database 22 of characteristics is defined as a database containing formatted information 15 for one or more image-capture appliances 1 and for one or more images 103.

The said database 22 of characteristics can be stored in centralized or distributed manner, and in particular can be:

integrated into image-capture appliance 1, integrated into optical system 100, integrated into a removable storage device, integrated into a PC or other computer connected to the other elements during image capture, integrated into a PC or other computer connected to the other elements after image capture, integrated into a PC or other computer capable of reading a storage medium shared with image-capture appliance 1, integrated into a remote server connected to a PC or other computer, itself connected to the other image-capture elements.

Fields

Referring to FIG. 8, a definition will now be given of the concept of fields 90. The formatted information 15 associated with image 103 can be recorded in several forms and structured into one or more tables, but it corresponds logically to all or part of fields 90, comprising:

(a) the focal distance,
(b) the depth of field
(c) the geometric defects.

The said geometric defects include geometric defects of image 103 characterized by the parameters associated with the filming characteristics 74 and a parameterizable transformation representing the characteristics of image-capture appliance 1 at the moment of filming. By means of the said parameters and of the said parameterizable transformation, it is possible to calculate the corrected position of a point of image 103.

The said geometric defects also include the vignetting characterized by the parameters associated with filming characteristics 74 and a parameterizable transformation representing the characteristics of image-capture appliance 1 at the moment of filming. By means of the said parameters and the said parameterizable transformation, it is possible to calculate the corrected intensity of a point of image 103.

The said geometric defects also include the color cast characterized by the parameters associated with filming characteristics 74 and a parameterizable transformation representing the characteristics of image-capture appliance 1 at the moment of filming. By means of the said parameters and the said parameterizable transformation, it is possible to calculate the corrected color of a point of image 103.

The said fields 90 also include (d) the sharpness of image 103.

The said sharpness includes the blurring in resolution of image 103 characterized by the parameters associated with filming characteristics 74 and a parameterizable transformation representing the characteristics of image-capture appliance 1 at the moment of filming. By means of the said parameters and the said parameterizable transformation, it is possible to calculate the corrected shape of a point of image 103. Blurring covers in particular coma, spherical aberration, astigmatism, grouping into pixels 104, chromatic aberration, depth of field, diffraction, parasitic reflections and field curvature.

The said sharpness also includes the blurring in depth of field, in particular spherical aberrations, coma and astigmatism. The said blurring depends on the distance of the points of scene 3 relative to image-capture appliance 1, and it is characterized by the parameters associated with filming characteristics 74 and a parameterizable transformation representing the characteristics of image-capture appliance 1 at the moment of filming. By means of the said parameters and of the said parameterizable transformation, it is possible to calculate the corrected shape of a point of image 103.

The said fields 90 also include (e) parameters of the quantization method. The said parameters depend on the geometry and physics of sensor 101, on the architecture of electronic unit 102 and on any processing software that may be used.

The said parameters include a function that represents the variations of intensity of a pixel 104 as a function of wavelength and light flux derived from the said scene 3. The said function includes in particular gamma information.

The said parameters also include:
the geometry of the said sensor 101, especially the shape, the relative position and the number of sensitive elements of the said sensor 101,
a function representative of the spatial and temporal distribution of noise of image-capture appliance 1,
a value representative of the exposure time for image capture.

The said fields 90 also include (f) parameters of the digital-processing operations performed by image-capture appliance 1, especially digital zoom and compression. These parameters depend on the processing software of image-capture appliance 1 and on the user's adjustments.

The said fields 90 also include:
(g) parameters representative of the user's preferences, especially as regards the degree of blurring and the resolution of image 103.
(h) the residual deviations 14.

Calculation of Formatted Information

The formatted information 15 can be calculated and recorded in database 22 in several stages.

a) A stage at the end of design of image-capture appliance 1.

By means of this stage it is possible to obtain intrinsic technical characteristics of image-capture appliance 1, and in particular:
the spatial and temporal distribution of the noise generated by electronic unit 102,
the formula for conversion of light flux to pixel value,
the geometry of sensor 101.

b) A stage at the end of calibration or design of the digital optical system.

By means of this stage it is possible to obtain other intrinsic technical characteristics of image-capture appliance 1, and in particular, for a certain number of values of characteristics used, the best associated transformation and the associated residual deviation 14.

c) A stage in which the user's preferences are chosen by means of pushbuttons, menus or removable media, or of connection to another device.

d) An image capture stage.

By means of this stage (d) it is possible to obtain technical characteristics of image-capture appliance 1 at the moment of image capture, and in particular the exposure time, which is determined by the manual or automatic adjustments made.

By means of stage (d) it is also possible to obtain the focal distance. The focal distance is calculated from:
a measurement of the position of the group of lenses of variable focal length of optical system 100 of the configuration used, or
a set value input to the positioning motor, or
a manufacturer's value if the focal length is fixed.

The said focal distance can then be determined by analysis of the content of image 103.

By means of stage (d) it is also possible to obtain the depth of field. The depth of field is calculated from:
a measurement of the position of the group of focusing lenses of optical system 100 of the configuration used, or
a set value input to the positioning motor, or
a manufacturer's value if the depth of field is fixed.

By means of stage (d) it is also possible to obtain the defects of geometry and of sharpness. The defects of geometry and of sharpness correspond to a transformation calculated by means of a combination of transformations of the database 22 of characteristics obtained at the end of stage (b). This combination is chosen to represent the values of parameters corresponding to the characteristics 74 used, especially the focal distance.

By means of stage (d) it is also possible to obtain the parameters of digital processing performed by image-capture appliance 1. These parameters are determined by the manual or automatic adjustments made.

The calculation of formatted information 15 according to stages (a) to (d) can be performed by:
- a device or software integrated into image-capture appliance 1, and/or
- driver software in a PC or other computer, and/or
- software in a PC or other computer, and/or
- a combination of the three.

The foregoing transformations in stage (b) and stage (d) can be stored in the form of:
- a general mathematical formula,
- a mathematical formula for each point,
- a mathematical formula for certain characteristic points.

The mathematical formulas can be described by:
- a list of coefficients,
- a list of coefficients and coordinates.

By means of these different methods it is possible to reach a compromise between the size of the memory available for storage of the formulas and the calculating power available for calculation of the corrected images 71.

In addition, in order to retrieve the data, identifiers associated with the data are recorded in database 22. These identifiers include in particular:
- an identifier of the type and of the reference of image-capture appliance 1,
- an identifier of the type and of the reference of optical system 100, if it is removable,
- an identifier of the type and of the reference of any other removable element having a link to the stored information,
- an identifier of image 103,
- an identifier of the formatted information 15.

Completed Image

As described by FIG. 11, a completed image 120 is defined as the image 103 associated with the formatted information 15. This completed image 120 can preferentially have the form of a file. Completed image 120 can also be distributed into a plurality of files.

Completed image 120 can be calculated by image-capture appliance 1. It can also be calculated by an external calculating device, such as a computer.

Image-processing Software

Image-processing software 4 is defined as software that accepts one or more completed images 120 as input and that performs processing operations on these images. These processing operations can include in particular:
- calculating a corrected image 71,
- performing measurements in the real world,
- combining several images,
- improving the fidelity of the images relative to the real world,
- improving the subjective quality of images,
- detecting objects or persons 107 in a scene 3,
- adding objects or persons 107 to a scene 3,
- replacing or modifying objects or persons 107 in a scene 3,
- removing shadows from a scene 3,
- adding shadows to a scene 3,
- searching for objects in an image base.

The said image-processing software can be:
- integrated into image-capture appliance 1,
- run on calculating means 17 connected to image-capture appliance 1 by transmission means 18.

Digital Optical System

A digital optical system is defined as the combination of an image-capture appliance 1, a database 22 of characteristics and a calculating means 17 that permits:
- image capture of an image 103,
- calculation of the completed image,
- calculation of the corrected image 71.

Preferentially, the user obtains corrected image 71 directly. If he wishes, the user may demand suppression of automatic correction.

The database 22 of characteristics may be:
- integrated into image-capture appliance 1,
- integrated into a PC or other computer connected to the other elements during image capture,
- integrated into a PC or other computer connected to the other elements after image capture,
- integrated into a PC or other computer capable of reading a storage medium shared with image-capture appliance 1,
- integrated into a remote server connected to a PC or other computer, itself connected to the other image-capture elements.

Calculating means 17 may be:
- integrated onto a component together with sensor 101,
- integrated onto a component together with part of electronics unit 102,
- integrated into image-capture appliance 1,
- integrated into a PC or other computer connected to the other elements during image capture,
- integrated into a PC or other computer connected to the other elements after image capture,
- integrated into a PC or other computer capable of reading a storage medium shared with image-capture appliance 1,
- integrated into a remote server connected to a PC or other computer, itself connected to the other image-capture elements.

Processing of the Complete Chain

The foregoing paragraphs have essentially presented precise details of the concepts and description of the method and system according to the invention for providing, to image-processing software 4, formatted information 15 related to the characteristics of image-capture appliance 1.

In the paragraphs to follow, an expanded definition will be given of the concepts and a supplemented description will be given of the method and system according to the invention for providing, to image-processing software 4, formatted information 15 related to the characteristics of image-restitution means 19. In this way the processing of a complete chain will be explained.

By means of the processing of the complete chain, it is possible:
- to improve the quality of image 103 from one end of the chain to the other, to obtain a restituted image 191 while correcting the defects of image-capture appliance 1 and of image-restitution means 19, and/or
- to use optical systems of lower quality and of lower cost in a video projector in combination with software for improvement of image quality.

Definitions Associated with the Image-restitution Means

On the basis of FIGS. 2 and 6, a description will now be given of how the characteristics of an image-restitution means 19 such as a printer, a visual display screen or a projector are taken into account in the formatted information 15.

The supplements or modifications to be made to the definitions in the case of an image-restitution means 19 may be inferred by analogy by a person skilled in the art by analogy with the definitions provided in the case of an image-capture appliance 1. Nevertheless, in order to illustrate this method, a description with reference in particular to FIG. 6 will now be given of the main supplements or modifications.

By restitution characteristics 95 used there are designated the intrinsic characteristics of image-restitution means 19, the characteristics of image-restitution means 19 at the moment of image restitution, and the user's preferences at the moment of image restitution. In the case of a projector in particular, the restitution characteristics 95 used include the shape and position of the screen used. The concept of restitution characteristics 95 used is an extension of the concept of variable characteristic.

By parameterizable restitution transformation model 97 (or parameterizable restitution transformation 97 for short), there is designated a mathematical transformation similar to parameterizable transformation model 12.

By corrected restitution image 94 there is designated the image obtained by application of parameterizable restitution transformation 97 to image 103.

By mathematical restitution projection 96 there is designated a mathematical projection that associates, with a corrected restitution image 94, a mathematical restitution image 92 on the mathematical restitution surface geometrically associated with the surface of restitution medium 190. The mathematical restitution points of the mathematical restitution surface have a shape, position, color and intensity calculated from corrected restitution image 94.

By real restitution projection 90 there is designated a projection that associates a restituted image 191 with an image 103. The pixel values of image 103 are converted by the electronic unit of restitution means 19 to a signal that drives the modulator of restitution means 19. Real restitution points are obtained on restitution medium 190. The said real restitution points are characterized by shape, color, intensity and position. The phenomenon of grouping into pixels 104 described hereinabove in the case of an image-capture appliance 1 does not occur in the case of an image-restitution means. On the other hand, an inverse phenomenon occurs, with the result in particular that lines take on a staircase appearance.

Restitution difference 93 is designated as the difference between restituted image 191 and mathematical restitution image 92. This restitution difference 93 is obtained by analogy with difference 73.

By restitution reference there is designated an image 103 in which the values of pixels 104 are known.

By best restitution transformation there is designated for a restitution reference and the restitution characteristics 95 used, that with which image 103 can be transformed to a corrected restitution image 94 such that its mathematical restitution projection 92 exhibits the minimum restitution difference 93 compared with restituted image 191.

The methods of restitution calibration and of design of the digital optical restitution system are comparable with the methods of calibration and of design of the digital optical system in the case of an image-capture appliance 1. Nevertheless, differences are present in certain stages, and in particular the following stages:
- the stage of choosing a restitution reference;
- the stage of performing restitution of the said restitution reference;
- the stage of calculating the best restitution transformation.

The formatted information 15 related to an image-capture appliance 1 and that related to an image-restitution means 19 can be used end-to-end for the same image.

In the foregoing, a description was given of the concept of field in the case of an image-capture appliance 1. This concept is also applicable by analogy in the case of image-restitution means 19. Nonetheless the parameters of the quantization method are replaced by the parameters of the signal-reconstitution method, meaning: the geometry of restitution medium 190 and its position, a function representing the spatial and temporal distribution of the noise of image-restitution means 19.

Generalization of the Concepts

The technical features of which the invention is composed and which are specified in the claims have been defined, described and illustrated by referring essentially to image-capture appliances of digital type, or in other words appliances that produce digital images. It can be easily understood that the same technical features are applicable in the case of image-capture appliances that would be the combination of an appliance based on silver technology (a photographic or cinematographic appliance using sensitive silver halide films, negatives or reversal films) with a scanner for producing a digital image from the developed sensitive films. Certainly it is appropriate in this case to adapt at least some of the definitions used. Such adaptations are within the capability of the person skilled in the art. In order to demonstrate the obvious character of such adaptations, it is merely necessary to mention that the concepts of pixel and pixel value illustrated by referring to FIG. 3 must, in the case of the combination of an appliance based on silver technology with a scanner, be applied to an elemental zone of the surface of the film after this has been digitized by means of the scanner. Such transpositions of definitions are self-evident and can be extended to the concept of the configuration used. As an example, the list of removable subassemblies of image-capture appliance 1 included in the configuration used can be supplemented by the type of photographic film effectively used in the appliance based on silver technology.

Implementation of the System

FIG. 25 illustrates a practical example of the system with which the invention described in the foregoing can be employed. This system contains first calculating means MC1 related to an image I derived from an appliance APP1 and/or from an appliance chain P3 possessing variable characteristics. As described in the foregoing, these calculating means will calculate the measured formatted information IFM from characteristics of the appliances, from variable characteristics depending on the image and from the associated values (focal length, focusing, speed, aperture, etc.). Second calculation means MC2 will calculate the extended formatted information from the measured formatted information and from the variable characteristics and their associated values, in such a way that the extended formatted information is more compact in memory and makes it possible, as the case may be, to estimate information related to the distortion defect at points other than the points related to the measured formatted information. The measured formatted information IFM and the extended formatted information IFE are provided to selection means MS1 to produce formatted information IF.

Application of the Invention to Cost Reduction

Cost reduction is defined as a method and system for lowering the cost of an appliance or of an appliance chain P3, especially the cost of the optical system of an appliance or of an appliance chain, the method consisting in:
  reducing the number of lenses, and/or
  simplifying the shape of the lenses, and/or
  designing an optical system having defects P5 that are larger than those desired for the appliance or the appliance chain, or choosing the same from a catalog, and/or
  using materials, components, processing operations or manufacturing methods that are less costly for the appliance or the appliance chain and that add defects P5.

The method and system according to the invention can be used to lower the cost of an appliance or of an appliance chain: it is possible to design a digital optical system, to produce formatted information IF related to the defects of the appliance or of the appliance chain, to use this formatted information to enable image-processing means, whether they are integrated or not, to modify the quality of images derived from or addressed to the appliance or to the appliance chain, in such a way that the combination of the appliance or the appliance chain with the image-processing means is capable of capturing, modifying or restituting images of the desired quality at reduced cost.

The invention claimed is:

1. A method for producing formatted information related to appliances of an appliances chain, the appliance chain including at least one image-capture appliance and/or at least one image-restitution appliance, in which the appliance contains at least one variable characteristic depending on the image, each variable characteristic being configured to be associated with one or more values of characteristic, the method comprising:
  capturing or restituting a reference scene by the appliance, to produce, on a medium, characteristic image points that are images of reference points of the reference scene;
  establishing a bijection between the characteristic image points and the reference points, so as to obtain a measured field composed of set of pairs composed of one of the reference points, and of the characteristic image point associated by the bijection;
  selecting one or more variable characteristics among the set of variable characteristics and including, in the measured field, the value for each image of each of the selected variable characteristic;
  selecting on the medium, only four characteristic image points such that a quadrilateral defined by the four characteristic image points has a maximum area and a center of gravity situated in proximity of the geometric center of the image;
  choosing a mathematical projection between the medium and a reference surface, the mathematical projection being a bilinear transformation that transforms the four characteristic image points into four specific reference points among said reference points associated by the bijection with the four characteristic image points,
  wherein the measured field includes the value for the image of each of the four specific reference points and the mathematical projection onto the reference surface of the four characteristic image points, and/or of the pair composed of the four characteristic image points and the mathematical projection of the four specific reference points onto the medium; and
  producing, from the measured field, said formatted information related to geometric distortions of the appliance.

2. A method according to claim 1, wherein the formatted information comprises data related to a technical characteristic of an image capture appliance at the moment of the image capture, and/or data related to preferences of a user of the image-capture appliance.

3. A method according to claim 1, wherein the formatted information produced from the formatted information is represented by parameters of a parameterizable model chosen from among a set of parameterizable models, the method further comprising:
  selecting the parameterizable model within the set of parameterizable models by:
    defining a maximum deviation,
    ordering the parameterizable models of the set of parameterizable models in accordance with their degree of complexity of employment, and
    choosing a first of the parameterizable models of the ordered set of parameterizable models such that the deviation is smaller than the maximum deviation.

4. A method according to claim 1, further comprising:
  obtaining, from the formatted information, extended formatted information related to an arbitrary reference point on the reference surface and/or related to an arbitrary characteristic image point of the medium, by deducing the formatted information related to the arbitrary reference point or to the arbitrary characteristic image point.

5. A method according to claim 1, wherein
  the appliance of the appliance chain is provided with at least one variable characteristic depending on the image, each variable characteristic configured to be associated with a value to form a combination composed of the set of the variable characteristics and of the values, the method further comprising:
  selecting predetermined combinations; and
  calculating, including employing a first calculation algorithm for each of the selected predetermined combinations.

6. A method according to claim 5, wherein
  an argument is defined, depending on a case, as an arbitrary reference point on the reference surface and a combination, or an arbitrary characteristic image point of the medium and a combination, the method further comprising:
  deducing, from the formatted information, extended formatted information related to an arbitrary argument.

7. A method according to claim 4, wherein to deduce the extended formatted information from the formatted information a first threshold is defined and the extended formatted information is selected such that the deviation is below the first threshold.

8. A method according to claim 1, wherein the image is a color image composed of a plurality of color planes, the method further comprising:
producing the formatted information by employing a first calculation algorithm for at least two of the color planes, by using a same mathematical projection for each of the color planes.

9. A method according to claim 1, wherein the image is a color image composed of a plurality of color planes, the method further comprising:
producing the formatted information by employing a first calculation algorithm for at least one of the color planes, by using a same virtual reference for each of the color planes, wherein the formatted information can correct chromatic aberrations of the appliance.

10. A system for producing formatted information related to appliances of an appliances chain, the appliance chain including at least one image-capture appliance and/or at least one image-restitution appliance, in which the appliance contains at least one variable characteristic depending on the image, each variable characteristic configured to be associated with one or more values of characteristic, the system comprising:
means for capturing or restituting a reference scene by the appliance, to produce, on a medium, characteristic image points that are images of reference points of the reference scene;
means for establishing a bijection between the characteristic image points and the reference points, so as to obtain a measured field composed of set of pairs composed of one of the reference points, and of the characteristic image point associated by the bijection;
means for selecting one or more variable characteristics among the set of variable characteristics and including, in the measured field, the value for each image of each of the selected variable characteristic;
means for selecting on the medium, only four characteristic image points such that a quadrilateral defined by the four characteristic image points has a maximum area and a center of gravity situated in proximity of the geometric center of the image;
means for choosing a mathematical projection between the medium and a reference surface, the mathematical projection being a bilinear transformation that transforms the four characteristic image points into four specific reference points among said reference points associated by the bijection with the four characteristic image points,
wherein the measured field includes the value for the image of each of the four specific reference points and the mathematical projection onto the reference surface of the four characteristic image points, and/or of the pair composed of the four characteristic image points and the mathematical projection of the four specific reference points onto the medium; and
means for producing, from the measured field, said formatted information related to geometric distortions of the appliance.

11. The system of claim 10, wherein the formatted information comprises data related to a technical characteristic of an image capture appliance at the moment of the image capture, and/or data related to preferences of a user of the image-capture appliance.

12. A system according to claim 10, wherein
the formatted information produced from the formatted information is represented by parameters of a parameterizable model chosen from among a set of parameterizable models, the system further comprising:
selection means for selecting the parameterizable model within the set of parameterizable models, the selection means including data-processing means for defining a maximum deviation, ordering the parameterizable models of the set of parameterizable models in accordance with their degree of complexity of employment, choosing a first of the parameterizable models of the ordered set of parameterizable models such that the deviation is smaller than the maximum deviation.

13. A system according to claim 10, further comprising:
data-processing means for obtaining, from the formatted information, extended formatted information related to an arbitrary reference point on the reference surface and/or related to an arbitrary characteristic image point of the medium, by deducing the formatted information related to the arbitrary reference point or to the arbitrary characteristic image point.

14. A system according to claim 10, wherein
the appliance of the appliance chain is provided with at least one variable characteristic depending on the image, each variable characteristic configured to be associated with a value to form a combination composed of the set of the variable characteristics and of the values, the system further comprising:
selection means for selecting predetermined combinations; and
calculating means for calculating formatted information, by employing a first calculation algorithm for each of the selected predetermined combinations.

15. A system according to claim 14, wherein
an argument designates, depending on a case, an arbitrary reference point on the reference surface and a combination, or an arbitrary characteristic image point of the medium and a combination, the system further comprising:
data-processing means for deducing, from the formatted information, extended formatted information related to an arbitrary argument.

16. A system according to claim 13, wherein to deduce the extended formatted information from the formatted information, the data-processing means includes selection means for selecting the extended formatted information such that the deviation is below a first threshold.

17. A system according to claim 10, wherein
the image is a color image composed of a plurality of color planes, the system further comprising:
data-processing means for producing the formatted information by employing a first calculation algorithm for at least two of the color planes, by using a same mathematical projection for each of the color planes, wherein the formatted information can correct distortions and/or chromatic aberrations of the appliance.

18. A system according to claim 10, wherein
the image is a color image composed of a plurality of color planes, the system further comprising:
data-processing means for producing the formatted information by employing a first calculation algorithm for at least one of the color planes, by using a same virtual reference for each of the color planes, wherein the formatted information can correct chromatic aberrations of the appliance.

* * * * *